(12) United States Patent
Kozu et al.

(10) Patent No.: US 7,194,927 B2
(45) Date of Patent: Mar. 27, 2007

(54) OPERATING POSITION SELECT DEVICE FOR AUTOMATIC TRANSMISSION

(75) Inventors: Tadao Kozu, Tokyo (JP); Yukitsugu Hirota, Tokyo (JP); Eiji Yamatani, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 184 days.

(21) Appl. No.: 10/941,073

(22) Filed: Sep. 15, 2004

(65) Prior Publication Data

US 2005/0081670 A1 Apr. 21, 2005

(30) Foreign Application Priority Data

Sep. 17, 2003 (JP) .............................. 2003-325152

(51) Int. Cl.
*B60K 17/04* (2006.01)

(52) U.S. Cl. ...................... 74/473.12; 74/335

(58) Field of Classification Search ............ 74/473.12, 74/335, 473.15, 473.1, 425; 475/131, 132; 477/122, 123, 79
See application file for complete search history.

(56) References Cited

U.S. PATENT DOCUMENTS

| | | | | |
|---|---|---|---|---|
| 4,856,360 A | * | 8/1989 | Yoshimura et al. | 74/335 |
| 6,209,408 B1 | * | 4/2001 | DeJonge et al. | 74/335 |
| 6,499,371 B2 | * | 12/2002 | Tsuzuki et al. | 74/335 |
| 6,637,281 B2 | * | 10/2003 | Yamamoto | 74/335 |
| 6,948,398 B2 | * | 9/2005 | Dybro | 74/471 XY |
| 2005/0066759 A1 | * | 3/2005 | Hirota et al. | 74/473.1 |
| 2005/0139030 A1 | * | 6/2005 | Shimamura et al. | 74/473.12 |
| 2005/0160849 A1 | * | 7/2005 | Kozu et al. | 74/335 |
| 2005/0176555 A1 | * | 8/2005 | Osamura et al. | 477/115 |
| 2005/0247154 A1 | * | 11/2005 | Osamura et al. | 74/473.12 |

FOREIGN PATENT DOCUMENTS

| | | |
|---|---|---|
| EP | 0 872 670 B1 | 10/1998 |
| EP | 1 156 237 B1 | 11/2001 |
| JP | 9-323559 A | 12/1997 |
| JP | 2003-97694 A | 4/2003 |

* cited by examiner

*Primary Examiner*—Rodney H. Bonck
*Assistant Examiner*—Justin K. Holmes
(74) *Attorney, Agent, or Firm*—Foley & Lardner LLP

(57) ABSTRACT

An operating position select device for an automatic transmission has a select lever unit having a select lever operated by a driver; a mode shift unit mounted on the automatic transmission to shift operation modes of the automatic transmission; a first and second control cables and others for mechanically connecting the select lever and the mode shift unit, and an actuator for outputting assist torque to shift the mode shift unit. An operating angle sensor detects an operating angle of the select lever and an assist angle sensor detects an assist angle of the assist actuator. A control unit controls a drive current supplied to the assist actuator based on the operating angle and the assist angle.

20 Claims, 19 Drawing Sheets

FIG. 12

| | | | TIME | | | | | |
|---|---|---|---|---|---|---|---|---|
| | | | ΔT | 2ΔT | 3ΔT | 4ΔT | 5ΔT | 6ΔT | ... |
| NORMAL | P→R | Xa | 0 | 1 | 2 | 3 | 4 | 5 | ... |
| | | Xb | 0 | 0 | 0 | 1 | 2 | 3 | ... |
| | | | TIME | | | | | |
| | | | ΔT | 2ΔT | 3ΔT | 4ΔT | 5ΔT | 6ΔT | ... |
| | R→P | Xa | 0 | -1 | -2 | -3 | -4 | -5 | ... |
| | | Xb | 0 | 0 | 0 | -1 | -2 | -3 | ... |
| | | | TIME | | | | | |
| | | | ΔT | 2ΔT | 3ΔT | 4ΔT | 5ΔT | 6ΔT | ... |
| ABNORMAL | P→R | Xa | 0 | 1 | 2 | 3 | 4 | 5 | ... |
| | | Xb | 0 | 0 | 0 | 0 | 0 | 0 | ... |
| | | | TIME | | | | | |
| | | | ΔT | 2ΔT | 3ΔT | 4ΔT | 5ΔT | 6ΔT | ... |
| | R→P | Xa | 0 | -1 | -2 | -3 | -4 | -5 | ... |
| | | Xb | 0 | 0 | 0 | 0 | 0 | 0 | ... |

FIG. 14

| | | | TIME | | | | | |
|---|---|---|---|---|---|---|---|---|
| NORMAL | P→R | | ΔT | 2ΔT | 3ΔT | 4ΔT | 5ΔT | 6ΔT | ··· |
| | | Xa | 0 | 0 | 1 | 2 | 3 | 4 | ··· |
| | | Xb | 0 | 0 | 0 | 0 | 1 | 2 | ··· |
| | R→P | | TIME | | | | | |
| | | | ΔT | 2ΔT | 3ΔT | 4ΔT | 5ΔT | 6ΔT | ··· |
| | | Xa | 0 | 0 | -1 | -2 | -3 | -4 | ··· |
| | | Xb | 0 | 0 | 0 | 0 | -1 | -2 | ··· |
| ABNORMAL | P→R | | TIME | | | | | |
| | | | ΔT | 2ΔT | 3ΔT | 4ΔT | 5ΔT | 6ΔT | ··· |
| | | Xa | 0 | 0 | 1 | 2 | 3 | 4 | ··· |
| | | Xb | 0 | 1 | 2 | 3 | 4 | 5 | ··· |
| | R→P | | TIME | | | | | |
| | | | ΔT | 2ΔT | 3ΔT | 4ΔT | 5ΔT | 6ΔT | ··· |
| | | Xa | 0 | 0 | -1 | -2 | -3 | -4 | ··· |
| | | Xb | 0 | -1 | -2 | -3 | -4 | -5 | ··· |

FIG. 18

| | | | TIME | | | | | | |
|---|---|---|---|---|---|---|---|---|---|
| | | | ΔT | 2ΔT | 3ΔT | 4ΔT | 5ΔT | 6ΔT | ··· |
| NORMAL | P→R | Xa | 0 | 1 | 2 | 3 | 4 | 5 | ··· |
| | | Xb | 0 | 0 | 1 | 2 | 3 | 4 | ··· |
| | | Xs | 0 | 0 | 0 | 0 | 1 | 1 | ··· |
| | | | TIME | | | | | | |
| | | | ΔT | 2ΔT | 3ΔT | 4ΔT | 5ΔT | 6ΔT | ··· |
| | R→P | Xa | 0 | -1 | -2 | -3 | -4 | -5 | ··· |
| | | Xb | 0 | 0 | -1 | -2 | -3 | -4 | ··· |
| | | Xs | 0 | 0 | 0 | 0 | 1 | 1 | ··· |
| | | | TIME | | | | | | |
| | | | ΔT | 2ΔT | 3ΔT | 4ΔT | 5ΔT | 6ΔT | ··· |
| NORMAL | P→R | Xa | 0 | 0 | 1 | 2 | 3 | 4 | ··· |
| | | Xb | 0 | 1 | 2 | 3 | 4 | 5 | ··· |
| | | Xs | 0 | 0 | 0 | 0 | 1 | 1 | ··· |
| | | | TIME | | | | | | |
| | | | ΔT | 2ΔT | 3ΔT | 4ΔT | 5ΔT | 6ΔT | ··· |
| | R→P | Xa | 0 | 0 | -1 | -2 | -3 | -4 | ··· |
| | | Xb | 0 | -1 | -2 | -3 | -4 | -5 | ··· |
| | | Xs | 0 | 0 | 0 | 0 | 1 | 1 | ··· |

FIG. 20

| | | | TIME | | | | | |
|---|---|---|---|---|---|---|---|---|
| NORMAL | P→R | | ΔT | 2ΔT | 3ΔT | 4ΔT | 5ΔT | 6ΔT | ... |
| | | Xs | 0 | 1 | 1 | 1 | 1 | 1 | ... |
| | | Xa | 0 | 0 | 1 | 2 | 3 | 4 | ... |
| | | Xb | 0 | 0 | 0 | 0 | 1 | 2 | ... |
| | R→P | | ΔT | 2ΔT | 3ΔT | 4ΔT | 5ΔT | 6ΔT | ... |
| | | Xs | 0 | 1 | 1 | 1 | 1 | 1 | ... |
| | | Xa | 0 | 0 | -1 | -2 | -3 | -4 | ... |
| | | Xb | 0 | 0 | 0 | 0 | -1 | -2 | ... |
| NORMAL | P→R | | ΔT | 2ΔT | 3ΔT | 4ΔT | 5ΔT | 6ΔT | ... |
| | | Xs | 0 | 0 | 0 | 0 | 1 | 1 | ... |
| | | Xa | 0 | 0 | 1 | 2 | 3 | 4 | ... |
| | | Xb | 0 | 0 | 0 | 0 | 1 | 2 | ... |
| | R→P | | ΔT | 2ΔT | 3ΔT | 4ΔT | 5ΔT | 6ΔT | ... |
| | | Xs | 0 | 0 | 0 | 0 | 1 | 1 | ... |
| | | Xa | 0 | 0 | -1 | -2 | -3 | -4 | ... |
| | | Xb | 0 | 0 | 0 | 0 | -1 | -2 | ... |

OPERATING POSITION SELECT DEVICE FOR AUTOMATIC TRANSMISSION

BACKGROUND OF THE INVENTION

1. Field of the Invention

The present invention relates to an operating position select device for an automatic transmission by which a driver can select by operating a select lever one of select mode positions corresponding to a plurality of operation modes of the automatic transmission.

2. Description of the Related Art

An operating position select device for an automatic transmission of this kind is disclosed in Japanese patent laying-open publication (Tokkaihei) No. 9-323559. This select device includes a select lever unit disposed near a driver's seat in a passenger compartment and a mode shift unit mounted on an automatic transmission. The select lever unit has a select lever manually operated by a driver and is connected with the mode shift unit by a connecting mechanism, such as a control cable, or a connecting linkage, which transmits an operating force applied on the select lever by the driver to the mode shift unit to shift operation modes of the automatic transmission.

The conventional art, however, has a problem that the select lever unit needs a long select lever in order to operate it without a large operating force of the driver, which reduces design freedom concerning to an installation location of the select lever unit and/or a layout of a passenger compartment.

This reason comes from that a length of the select lever is determined so that a driver can easily operate the select lever and its operating torque must overcome frictional resistance of the connecting mechanism and the like. Namely, the operating torque, generated by the operating force on the select lever, has to be larger than torque caused by the sum of the frictional resistance in the connecting mechanism and resistance generated when a detent pin, which moves with the select lever, gets over a cam top portion of a detent plate during select operation, although the operating force of the driver is limited to a certain extent. Accordingly, to satisfy both of the above requirements the select lever needs to be longer than a certain length, typically to be 350 mm.

Another operating position select device for an automatic transmission of this kind is disclosed in Japanese patent laying-open publication (Tokkai) No. 2003-97694. This select device is, what is called, a shift-by-wire type one. It has a select lever manually operated by a driver, a select position detector for detecting a position of the select lever, a mode shift unit mounted on an automatic transmission for shifting its operation modes, an electric motor for driving a mode shift unit, and a control unit for controlling the electric motor based on an output signal from the detector.

This select device is suitable for shortening a length of the select lever and expanding design freedom for its installation location and/or layout of a passenger compartment, while the select device lacks a mechanical connection between the select lever and the mode shift unit. This lack of the mechanical connection results in that the mode shift unit can not be sifted despite of operating the select lever in case of electrical failure such that an electric wire is broken, or the select position detector or the control unit fails.

It is, therefore, an object of the present invention to provide an operating position select device for an automatic transmission which overcomes the foregoing drawbacks and can expand design freedom concerning to layout of a passenger compartment and/or an installation location of a select lever unit and drive a mode shift unit despite of electric failure of the operating position select device.

SUMMARY OF THE INVENTION

According to the first aspect of the present invention there is provided an operating position select device for an automatic transmission comprising: a select lever unit having a select lever operated by a driver; an operating position sensor which detects an operating position of the select lever and outputs an operating position signal; a mode shift unit mounted on the automatic transmission to shift operation modes of the automatic transmission; a mechanically connecting means which mechanically connects the select lever and the mode shift unit with each other; an assist actuator which is arranged between said select lever and said mode shift unit and outputs assist torque to an intermediate portion of said mechanically connecting means to shift the mode shift unit; an assist position sensor which detects an assist position of the assist actuator and outputs an assist position signal; and a control unit which controls a drive current supplied to the assist actuator based on the operating position signal and the assist position signal.

Preferably, the control unit has a target speed generation means for computing a target speed based on a position difference between the operating position and the assist position to generate a target speed signal and a feedback control means for computing a feedback assist current based on a speed difference between an assist speed of the assist actuator and the target speed computed by the target speed generation means so that the drive current includes the feedback assist current.

Preferably, the feedback control means controls the position difference to be kept within a predetermined value.

Preferably, the predetermined value is set so that the position difference becomes smaller than the sum of a play amount and a lost motion amount of the mechanically connecting means.

Preferably, the control unit has a feedforward control means which computes a feedforward assist current based on the operating position and the assist position to output a feedforward current signal, and the control unit computes the drive current by adding the feedforward assist current to the feedback assist current.

Preferably, the feedforward control means is provided with a control table having data to determine the feedforward assist current according to an operating direction of the select lever.

Preferably, the feedforward assist current increases as one of an operating speed and an operating acceleration of the select lever becomes larger.

Preferably, the mode shift unit includes a detent mechanism which generates detent force and ensures a valve spool of a manual valve by the detent force to be positioned in a selected position, the control unit reducing the drive current when the detent force changes from an increasing phase to a reducing phase during a select operation of the select lever. The drive current may be reduced to zero.

Preferably, the intermediate portion of said mechanically connecting means is positioned nearer to said mode shift unit than said select lever.

Preferably, the control unit starts to drive the assist actuator when the select lever is held, and an operating position difference computed based on the operating positions of the select lever is not less than a first value, and an assist position difference computed based on the assist positions of the assist actuator is not less than a second value.

Preferably, the control unit starts to drive the assist actuator when the assist position difference becomes not less than the second value after the operating position difference is not less than the first value.

Preferably, the control unit is electrically connected to a touch sensor for detecting whether or not a knob of the select lever is touched by the driver, the control unit starting to drive the assist actuator when detected a touch on the knob by the touch sensor.

Preferably, the control unit starts to drive the assist actuator when the operating position difference is not less than the first value, and the assist position difference is not less than a second value after the touch sensor detects a touch on the knob by the driver.

BRIEF DESCRIPTION OF THE DRAWINGS

The objects, features and advantages of the present invention will become apparent as the description proceeds when taken in conjunction with the accompanying drawings, in which:

FIG. 12 is a table of an example of relation between time and outputs of an operating position sensor and an assist position sensor in normal and abnormal cases of the operating position select device of the second embodiment;

FIG. 14 is a table of an example of relation between time and outputs of an operating position sensor and an assist position sensor in normal and abnormal cases of the operating position select device of the third embodiment;

FIG. 18 is a table of an example of relation between time and outputs of an operating position sensor and an assist position sensor in normal and abnormal cases of the operating position select device of the fourth embodiment;

FIG. 20 is a table of an example of relation between time and outputs of an operating position sensor and an assist position sensor in normal and abnormal cases of the operating position select device of the fifth embodiment.

DETAILED DESCRIPTION OF THE PREFERRED EMBODIMENTS

Figure 1:
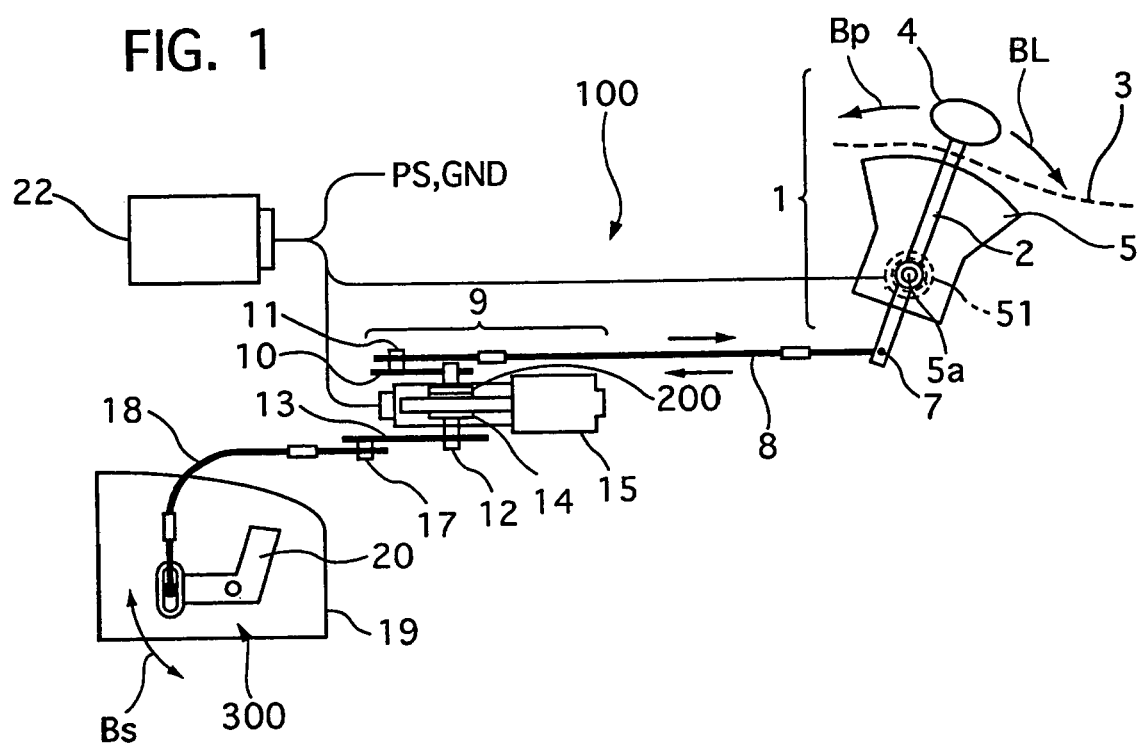
FIG. 1 is a schematic diagram showing a construction of an automatic transmission with an operating position select device of a first preferred embodiment according to the present invention.

Throughout the following detailed description, similar reference characters and numbers refer to similar elements in all figures of the drawings, and their descriptions are omitted for eliminating duplication.

An automatic transmission with an operating position select device of a first preferred embodiment according to the present invention will be described with reference to the accompanying drawings.

Referring to FIG. 1 of the drawing, there is shown an automatic transmission 19, which is a conventional multi-speed one with a plurality of planetary gear sets, not shown, and operated among a plurality of operation modes, for example, a parking mode, a reverse drive mode, a neutral mode, a forward drive mode, and a forward low geared drive mode.

The automatic transmission 19 is provided with an operating position select device 100, which shifts the operation modes to a desirable mode by a manually select operation of the select device 100.

The operating position select device 100 includes a select lever unit 1 manually operated by a driver, an operating angle sensor 51 for detecting an operating angle of the select lever 2, an mode shift unit 300 mounted on the automatic transmission 19, a first and second control cables 8 and 18 connecting the select lever 2 and the mode shift unit 300 with each other, an assist actuator 9 for assisting an operating force inputted to the select lever unit 1, an assist angle sensor 200 for detecting an assist angle, and a control unit 22 for controlling the assist actuator 9.

The operating angle sensor 51 corresponds to an operating position sensor of the present invention, and the assist angle sensor 200 corresponds to an assist position sensor of the present invention. The operating angle corresponds to an operating position of the present invention, and the assist angle corresponds to an assist position of the present invention.

The control unit 22 is electrically connected to a power supply PS and ground GND. The operating angle sensor 51 and the assist angle sensor 200 are electrically connected to the control unit 22.

The select lever unit 1 is arranged, for example, at a center console 3 beside a driver's seat and has the select lever 2, a bracket 5 fixed to a vehicle body, a supporting shaft 5a fixed on the bracket 5 to swingably support the select lever 2, a knob 4 mounted on the top of the select lever 2, and a checking mechanism, not shown, for ensuring the select lever 2 to be kept in a selected mode position.

The select lever 2 is set to about 100 mm in length in this embodiment, which is designed to be shorter by about 250 mm than a conventional type select lever. The lever 2 is operated by the driver swingably in a direction toward P position as indicated by an arrow Bp and an opposite direction toward L position as indicated by an arrow BL.

The select lever 2 can be positioned in one of select mode positions: P position corresponding to the parking mode of the automatic transmission 19, R position corresponding to the reverse drive mode, N position corresponding to the neutral mode, D position corresponding to the forward drive mode, and L position corresponding to the forward low geared drive mode.

Figure 5:
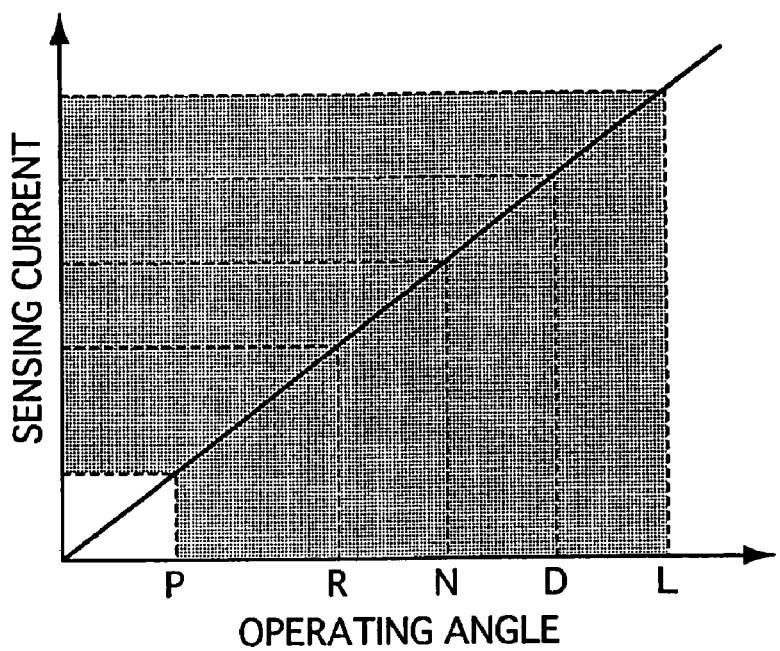
FIG. 5 is a diagram showing a relationship between an operating angle of a select lever and a sensing current outputted from an operating position sensor shown in FIG. 1.

The operating angle sensor 51 is electrically connected to the control unit 22 and detects an operating angle of the select lever 2 to output an operating angle signal to the control unit 22. FIG. 5 shows a relationship between the operating angle of the select lever 2 and a sensing current outputted from the operating angle sensor 51 as the operating angle signal. The sensing current outputted from the operating angle sensor 51 is proportional to the operating angle, both of which increase when the select lever 2 moves toward L position. The operating angle signal corresponds to an operating position signal of the present invention.

Figure 3:
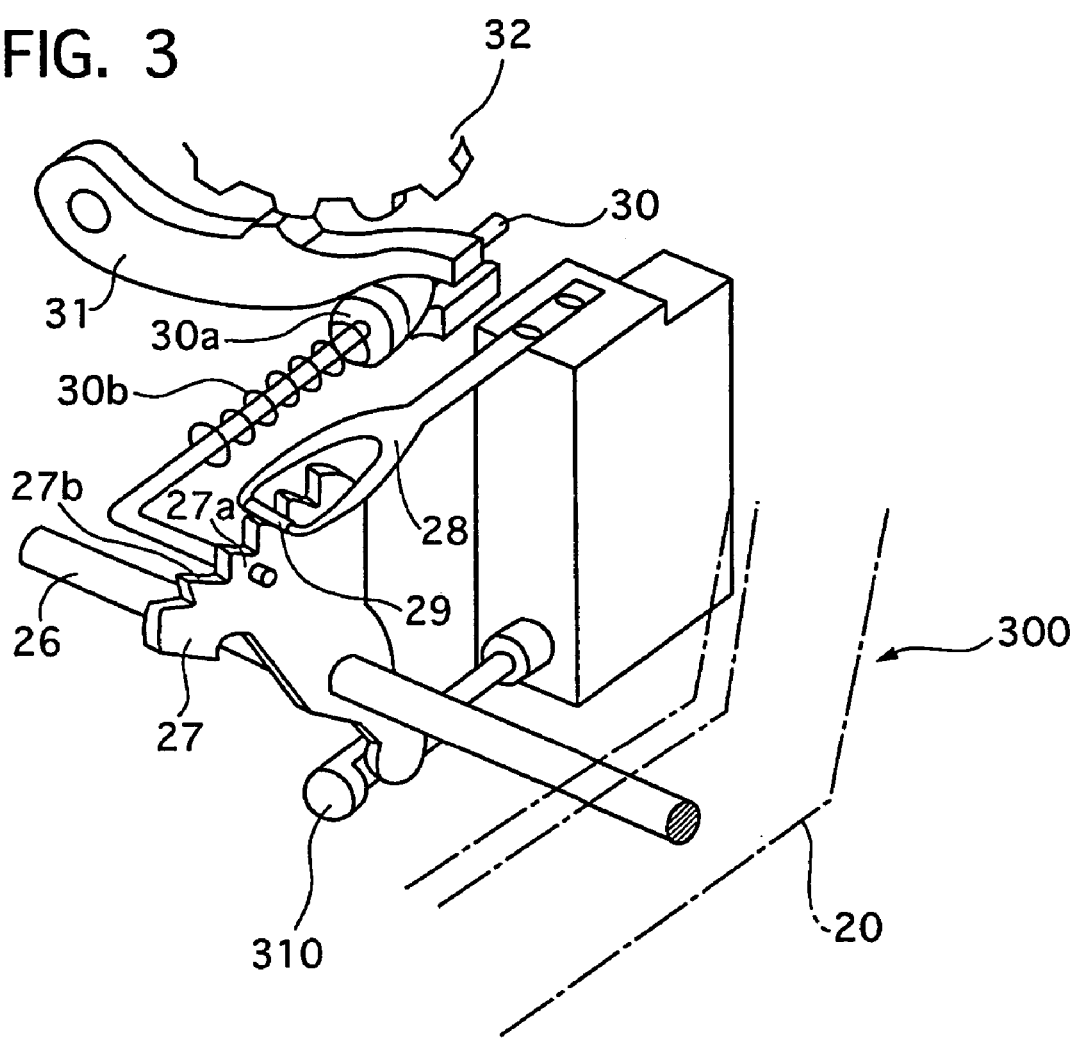
FIG. 3 is an enlarged perspective view showing a mode shift unit with a detent mechanism used in the operating position select device shown in FIG. 1.

The mode shift unit 300 shifts the operation modes of the automatic transmission 19 according to a movement of the select lever 2 through the first and second control cables 8 and 18. Referring to FIGS. 1 and 3 of the drawings, the mode shift unit 300 has a manual plate lever 20 and a detent mechanism for keeping the manual plate lever 20 in a selected one of the select mode positions. The manual plate lever 20 is fixed in its intermediate portion with a rotary shaft 26 to be rotatable together with the shaft 26. The second control cable 18 is connected with one end portion of the manual plate lever 20 to control a rotation angle of the manual plate lever 20. The rotary shaft 26 is fixed with a detent plate 27 of the detent mechanism. The detent plate 27 is connected with a valve spool 310 of a manual valve disposed in a control valve unit of the automatic transmission 19 so as to move the spool 300 to shift the manual valve.

The detent plate 27 is formed with a cam, having top portions 27a and bottom portions 27b, each bottom being arranged between the adjacent top portions 27a, on its upper portion. Positions of the bottom portions 27b correspond respectively to the five operation modes of the automatic transmission 19: P position, R position, N position, D position, and L position.

The cam is pressed by a detent pin 29 urged by a spring plate 28, whose one end portion is mounted on the control valve unit and the other end portion supports the detent pin 29. The detent pin 29 is formed at a tip of the spring plate 28 to be pressed onto the cam of the detent plate 27 to be positioned in one of the bottom portions 27b so as to detain the valve spool 310 of the manual valve in a selected mode position. The detent plate 27 formed with the top and bottom portions 27a and 27b, the detent pin 29, and the spring plate 28 corresponds to a detent mechanism of the present invention.

The detent plate 27 is coupled at its cam side portion with a parking rod 30 having a wedge 30a biased by a coil spring 30b. The wedge 30a can move along the rod 30 and press a parking pawl 31 by a spring force of the coil spring 30b to engage the pawl 31 with a parking wheel 32 united to an output shaft of the automatic transmission 19 when the select lever 2 is shifted to the P position. This engagement of the pawl 31 and the wheel 32 results in locking drive wheels of a vehicle for parking.

Figure 2:
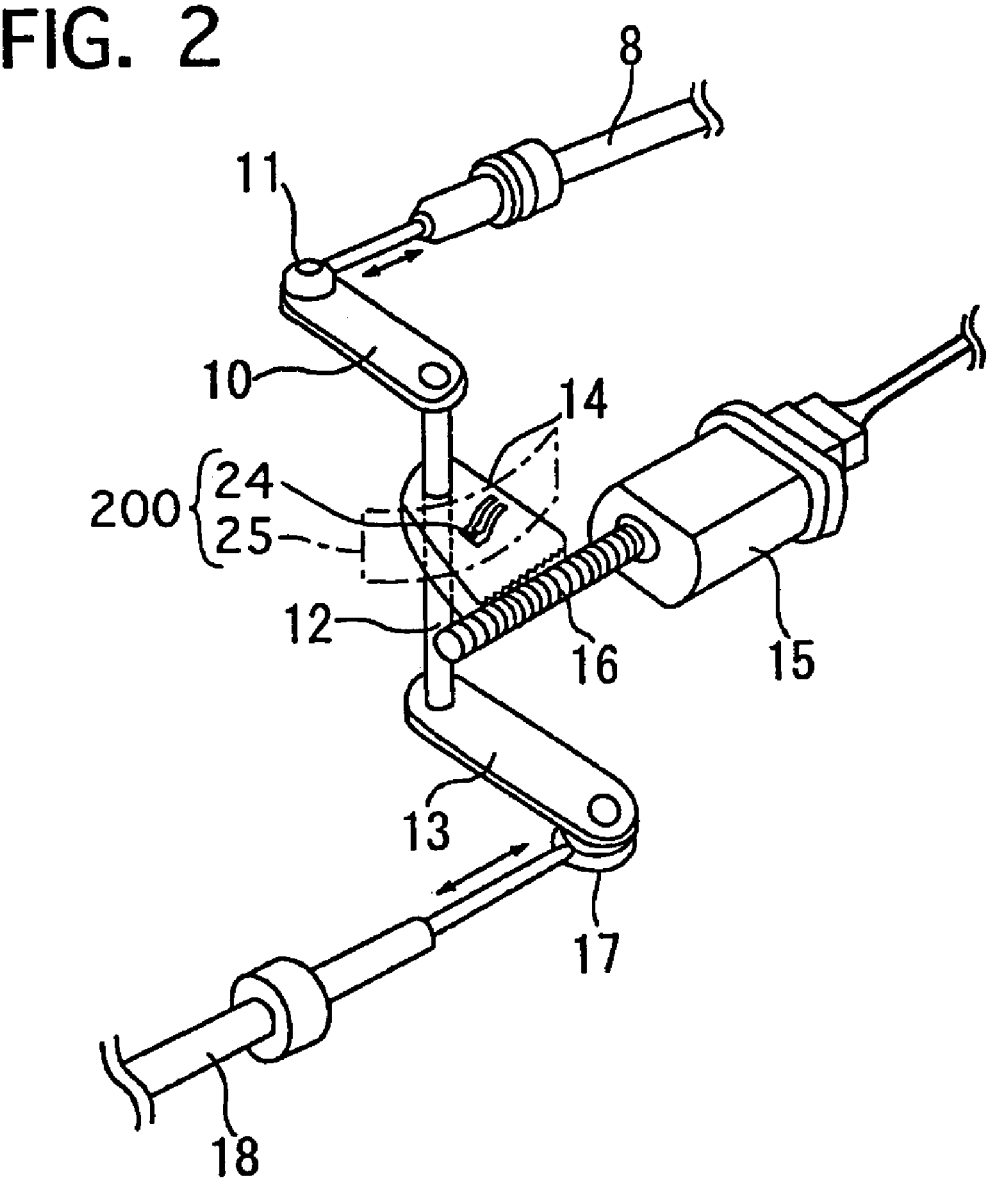
FIG. 2 is an enlarged perspective view showing an assist actuator used in the operating position select device shown in FIG. 1.

The detent plate 27 and the select lever 2 are, as shown in FIG. 1, mechanically connected with the first and second control cables 8 and 18, and others. As shown in FIGS. 1 and 2, the first control cable 8 connects at its one end portion with a bottom portion of the select lever 2 through a first joint 7 and at the other end portion with one end portion of an input lever 10 through a second joint 11. The other end portion of the input lever 10 is connected with a top portion of a coupling shaft 12, whose bottom portion is connected with one end portion of an output lever 13. The other end portion of the output lever 13 is connected with one end portion of the second control cable 18 through a third joint 17. The other end portion of the second control cable 18 is, as shown in FIGS. 1 and 3, connected with the manual plate lever 20.

The first and second control cables 8 and 18, the first to third joints 7, 11, and 17, the input and output plates 10 and 13, and the coupling shaft 12 corresponds to a mechanically connecting means of the present invention.

The assist actuator 9, as shown in FIG. 1 and especially in FIG. 2, includes an electric motor 15 with reduction gears to reduce a rotation speed of an output shaft of the motor 15, a worm 16 formed on the output shaft, and a worm wheel 14 which is in mesh with the worm 16 and united to the coupling shaft 12.

Figure 6:
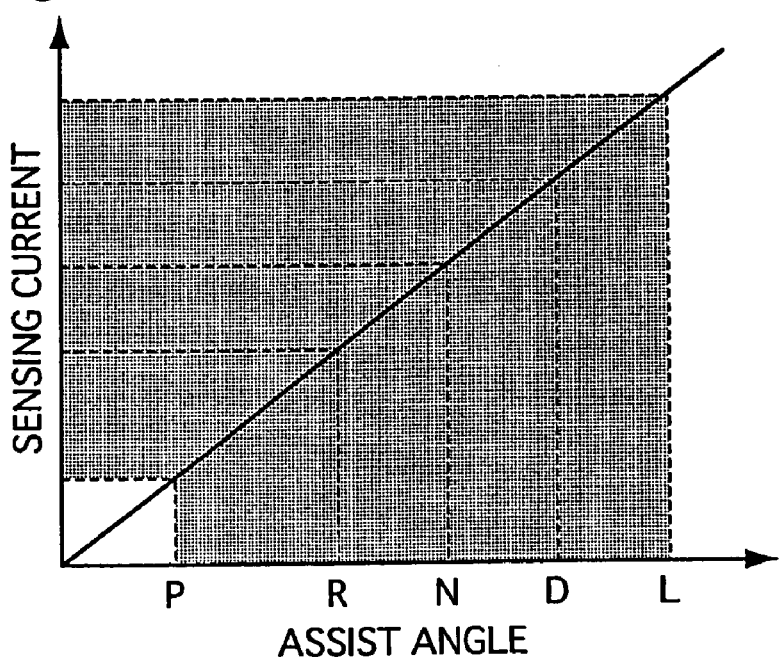
FIG. 6 is a diagram showing a relationship between an assist angle of the assist actuator and a sensing current outputted from an assist position sensor shown in FIGS. 1 and 2.
Figure 7:
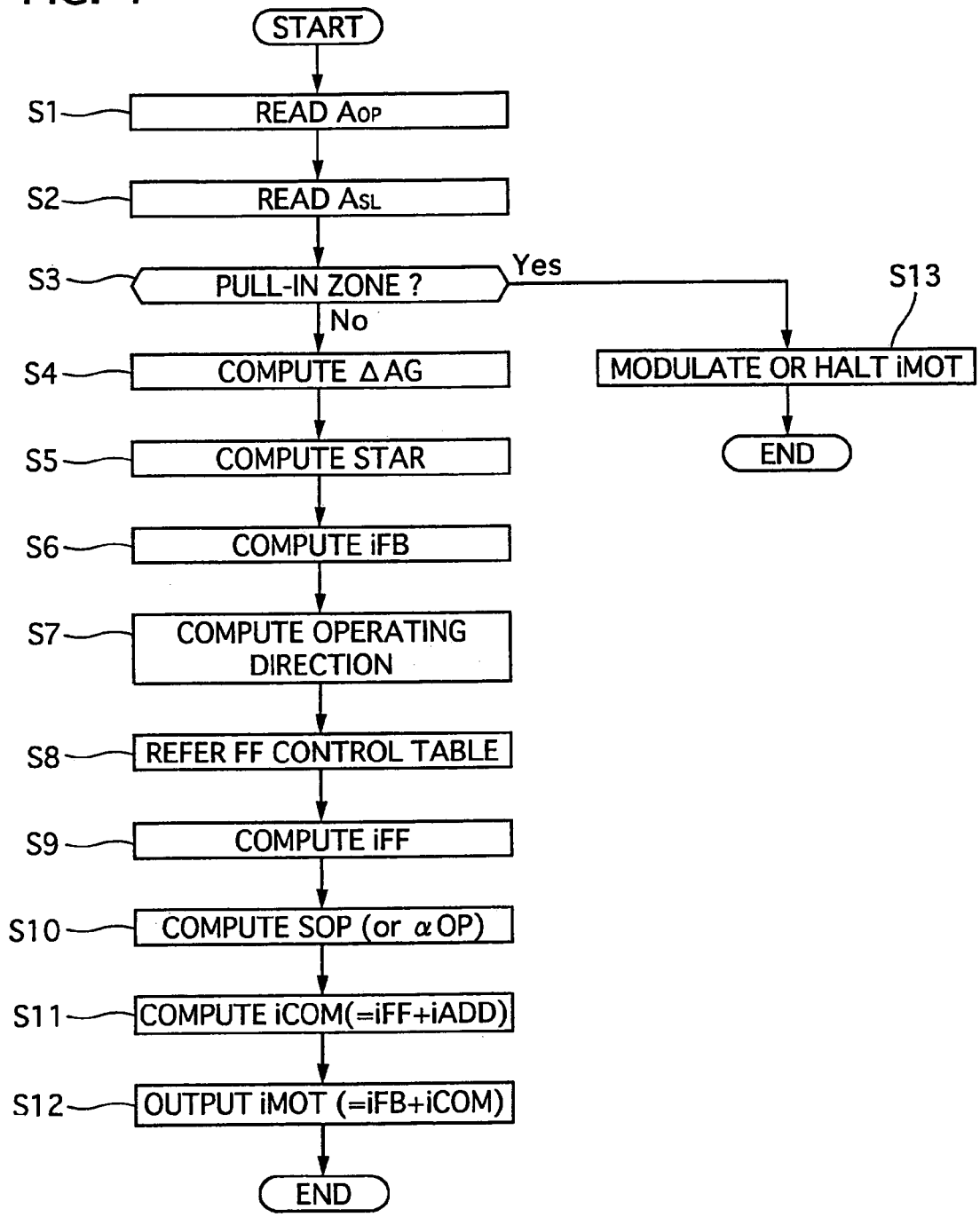
FIG. 7 is a flowchart of a process executed in the control unit for controlling an assist actuator during a select operation when the select lever is operated.

The worm wheel 14 is provided on its upper surface with an electric terminal 24 contacted to a carbon resistor 25, indicated by a dashed line in FIG. 2, printed on a substrate for detecting an assist angle of the coupling shaft 12. The electric terminal 24 is movable together with and around the coupling shaft 12 and changes its position with respect to the carbon resistor 25 to output an assist angle signal. The electric terminal 24 and the carbon resistor 25 constitute the assist angle sensor 200. FIG. 6 shows a relationship between the assist angle of the coupling shaft 12 and a sensing current outputted from the assist angle sensor 200 as the assist angle signal. The sensing current outputted from the assist angle sensor 200 is proportional to the assist angle, both of which increase when the select lever 2 moves toward L position. The assist angle sensor corresponds to an assist position sensor of the present invention, and the assist angle signal corresponds to an assist position signal of the present invention.

The assist angle sensor 200 and the motor 15 are electrically connected to the control unit 22.

The control unit 22 receives the operating angle signal outputted from the operating angle sensor 51 and the assist angle signal outputted from the assist angle sensor 200 to compute a target assist current based on these signals, and drives the electric motor 15 under pulse width modulation (PWM) control based on the target assist current.

Figure 4:
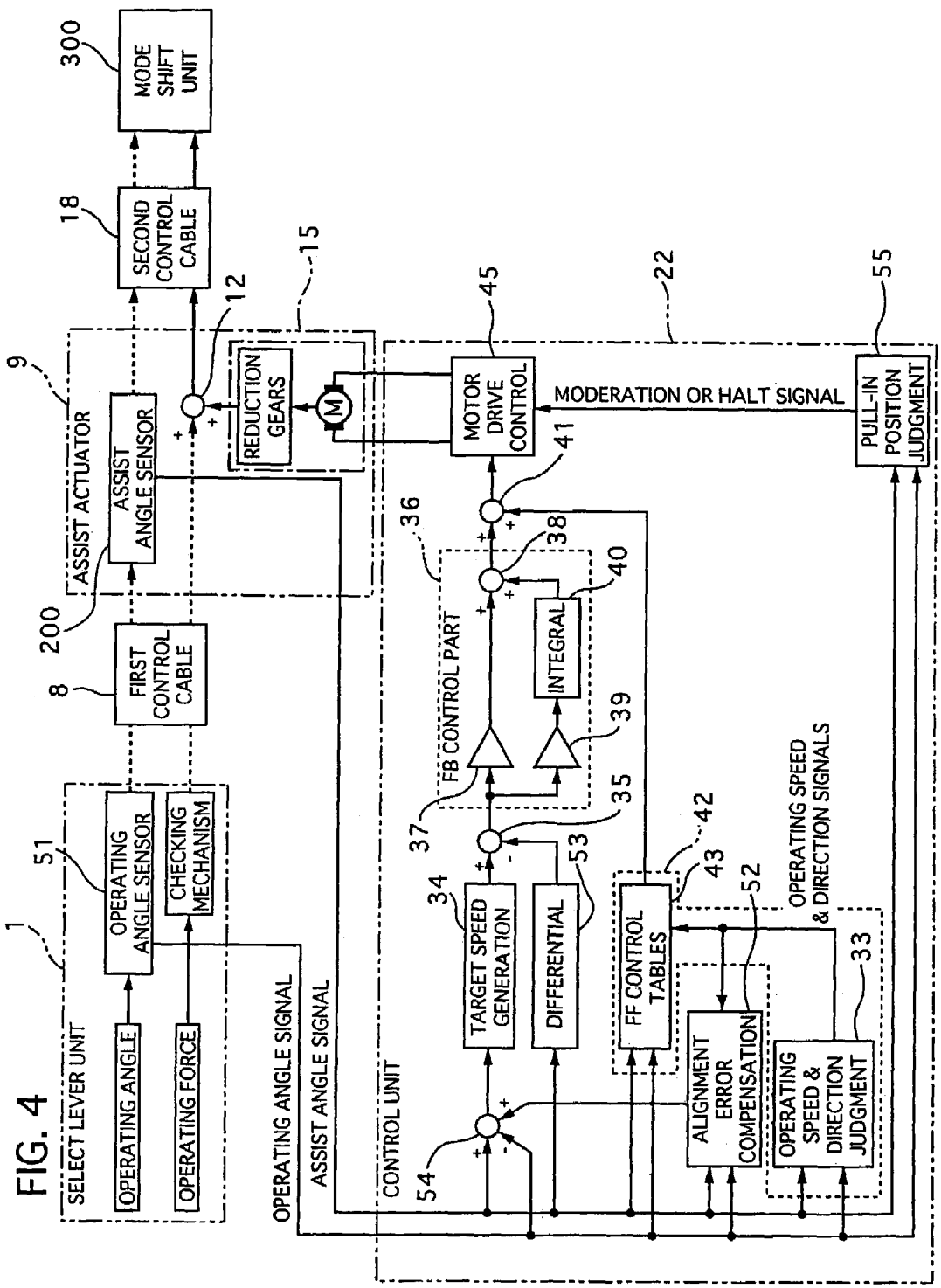
FIG. 4 is a control bock diagram of a control unit and its peripheral equipment used in the operating position select device shown in FIG. 1.

FIG. 4 shows a control block diagram of the control unit 22 and its related units. A select operation by a driver causes that an operating force of the driver inputs the select lever 2 to change its operating angle. The operating force is, transmitted to the first control cable 8 and the checking mechanism. The operating angle is detected by the operating angle sensor 51, which outputs an operating angle signal to the control unit 22.

The first control cable 18 rotates the worm wheel 14 united with the coupling shaft 12 to move the terminal 24 with respect to the carbon resistance 25. This relative angle between the terminal 24 and the resistance 25 is detected by the assist angle sensor 200 as an assist angle, and the sensor 200 outputs an assist angle signal to the control unit 22.

Note that not only the operating torque from the select lever 2 inputted by the driver but also an assist torque from the assist motor 15 is applied to the coupling shaft 12 to cause the assist angle.

The coupling shaft 12 drives the second control cable 18 to shift the mode sift unit 300 of the automatic transmission 19.

An operating speed and direction judgment part 33 computes the operating angle of the select lever 2 based on the operating angle signal outputted from the operating angle sensor 51 and the assist angle signal outputted from the assist angle sensor 200. Then, the operating speed and direction judgment part 33 computes an operating speed and judges an operating direction of the select lever 2 by calculating differential of the operating angles, and then outputs an operating speed signal and an operating direction signal to an alignment error compensation part 52 and a feedforward (FF) control table part 42.

The alignment error compensation part 52 computes an alignment error and outputs a compensation signal to a first adder 54 to compensate the signals outputted from the operating angle sensor 51 and the assist angle sensor 200. The alignment error I is computed in a state such that it can be apparently confirmed where the select lever 2 is positioned, for example, in P position.

The feedforward control table part 42 has a plurality of feedforward compensation tables which determine a feedforward current based on the operating angle, the assist angle, the operating speed, and the operating direction to output a feedforward current signal to a fourth adder 41. The tables are prepared according to the respective operating directions, the direction $B_P$ and $B_L$ of the select lever 2 shown in FIG. 1, and their data are set so that the feedforward current becomes larger as the operating speed becomes higher.

The first adder 54 computes an angle difference between the operating angle and the assist angle in view of the alignment error based on the operating angle signal, the assist angle signal, and the compensation signal to output an angle difference signal to a target speed generation part 34.

The target speed generation part 34 receives the angle difference signal and computes a target speed of the select lever 2 based on the angle difference to output a target speed signal to a second adder 35.

A differential element 53 receives the assist angle signal outputted from the assist angle sensor 200 to obtain an assist speed by calculating differential of the assist angles and outputs an assist speed signal to a second adder 35.

The second adder 35 receives the assist speed signal and computes a speed difference between the assist speed obtained by the differential part 53 and the target speed obtained by the target speed generation part 34 to output a speed difference signal to a feedback (FB) control part 36.

The feedback control part 36 includes a first multiplier 37, a third adder 38, a second multiplier 39 and an integral element 40. The first multiplier 37 computes a proportional current by multiplying the speed difference, obtained from the second adder 35, by a proportional gain and outputs a proportional current signal to the third adder 38. The second multiplier 39 computes a multiplied speed difference current by multiplying the speed difference, obtained from the second adder 35, by an integral gain and outputs a multiplied speed difference current signal to the integral element 40. The integral element 40 obtains an integral current by calculating integration of the multiplied speed difference currents and outputs an integral current signal to the third adder 38. The third adder 38 computes a feedback current by adding the integral current to the proportional current and outputs a feedback current signal to the fourth adder 41.

The fourth adder 41 computes a motor drive current by adding the feedforward current signal to the feedback current signal and outputs a motor drive current signal to a motor drive control part 45. The motor drive current corresponds to a drive current of the present invention.

The motor drive control part 45 outputs the motor drive current to the electric motor 15 under Power Width Modulation (PWM) control. In stead of the PMW control, the motor 15 may be driven under current control or armature voltage control.

A pull-in position judgement part 55 judges whether or not the assist angle obtained from the sensor 200 are positioned within a pull-in zone. When it is in the pull-in zone, the judgment part 55 outputs a modulation signal or a halt signal to the motor drive control part 45 to reduce or stop the motor drive current outputted to the motor 15.

In the pull-in zone, the detent pin 29 is urged toward a desired select direction by the spring plate 28 so as to move into the bottom portion 27b of the detent plate 27 after it gets over the top portion 27a, which causes the detent plate 27 to be biased toward the selecting direction such that a pull-in force acts the detent plate 27 to be rotated toward the bottom portion 27b. Correspondingly, a resistance to an operating force of the select lever 2 becomes smaller in the pull-in zone with respect to before the pull-in zone.

FIG. 5 shows a flowchart executed in the control unit 22 to control the assist actuator 9 when the select lever 2 is operated.

At step S1, the control unit 22 receives an operating angle signal from the operating angle sensor 51 to read an operating angle $A_{OP}$ of the select lever 2, and then the flow goes to step S2. At the step S2, the control unit 22 receives an assist angle signal from the assist angle sensor 200 to read an assist angle $A_{SL}$ of the coupling shaft 12 assisted by the assist actuator 9, and then the flow goes to step S3.

At the step S3, the pull-in position judgment part 55 determines based on the assist angle signal outputted from the assist angle sensor 200 whether or not the assist position is within the pull-in zone. If YES, the flow goes to step S13, while, if NO, the flow goes to step S4.

At the step S13, an electric current supplied to the electric motor 15 is reduced or turned off, so that an assist torque is reduced or not generated.

On the contrary, at the step S4, the first adder 54 computes an angle difference $\Delta AG$ between the operating angle $A_{OP}$ and the assist angle $A_{SL}$, and then the flow goes to step S5.

At the step S5, the target speed generation part 34 determines a targeted speed $S_{TAR}$ of the select lever 2 based on the angle difference $\Delta AG$, and the flow goes to step S6. At the step S6, the feedback control part 36 computes a feedback current $i_{FB}$, and then the flow goes to step S7.

At step the S7, the operating speed and direction judgment part 33 judges an operating direction of the select lever 2 operated by a driver based on the operating angle obtained from the operating angle sensor 51 and the assist angle obtained from the assist angle sensor 200, and then the flow goes to step S8.

At the step S8, the FF control table part 43 shifts the feedforward compensation tables to select and refer an optimum one according to the operating direction of the select lever 2 and the operating angle obtained from the operating angle sensor 51, and then the flow goes to step S9.

At the step S9, the FF control table part 43 computes a feedforward current $i_{FF}$ by using the selected optimum FF control table, and then the flow goes to step S10.

At the step S10, the operating speed and direction judgment part 33 calculates an operating speed $S_{OP}$ or an operating acceleration $α_{OP}$ of the select lever 2, and the flow goes to step S11.

At the step S11, the FF control table part 43 computes an additional compensation current $i_{ADD}$ based on the operating speed $S_{OP}$ or the operating acceleration $α_{OP}$. The table part 43 computes a compensated feedforward current $i_{COM}$ by adding the additional compensation current $i_{ADD}$ to the FF current $i_{FF}$, and then the flow goes to step S12.

At the step S12, the fourth adder 38 computes a motor drive current $i_{MOT}$ by adding the compensated feedforward current $i_{COM}$ to the feedback current $i_{FB}$ to output the motor drive current $i_{MOT}$ to the motor drive control part 45. This brings the electric motor 15b to run and assist the select operation of the select lever 2.

Figure 8:
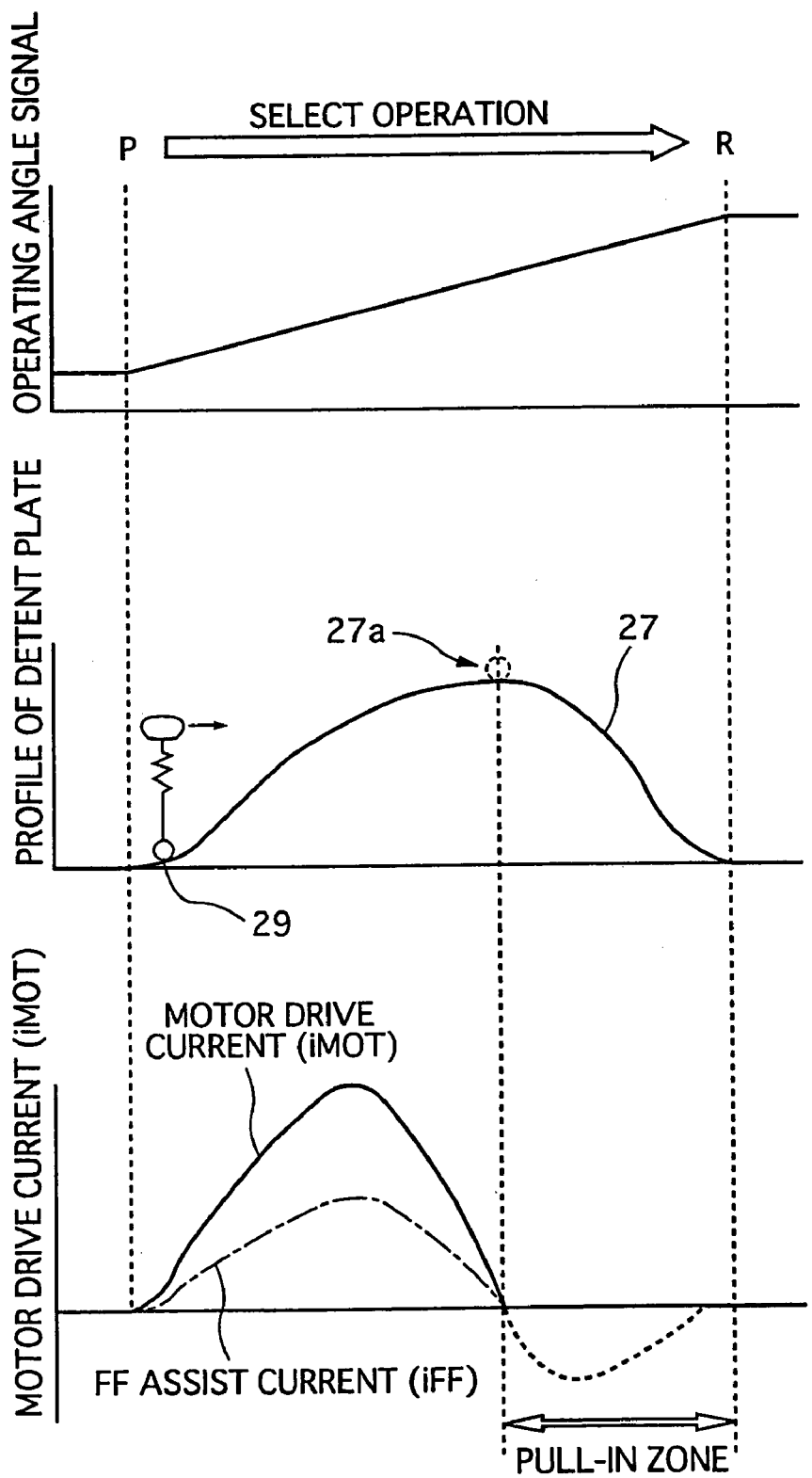
FIG. 8 is a schematic diagram showing relationships of an operating angle signal, a profile of a detent plate, a motor drive current with respect to a travel amount during the select lever is operated from P position to R position.

FIG. 8 shows relationships among an operating angle current signal, a profile of the detent plate 27, and a motor drive current with respect to an operating angle in a select operation when the select lever 2 is shifted from P position to R position.

In this operation, as shown in the upper part of FIG. 8, the operating angle signal outputted from the operating angle sensor 51 increases proportionally as the operating angle of the select lever 2 increases. As the operating angle increases, the detent pin 29, as shown in the intermediate part of FIG. 8, ascends from the bottom portion 27b of the detent plate 27 to the top portion 27a, which causes a resistance against the operating force applied on the select lever 2 to become larger at first and then descends. This change of the resistance demands the motor drive current $i_{MOT}$ to rise at first and then descend according to the resistance.

The motor drive current $i_{MOT}$ is shown in the lower part of FIG. 8 and includes an FF assist current $i_{FF}$ which is indicated by a dashed line. In this embodiment, the FF assist current $i_{FF}$ is set to about a half value, which corresponds to a reaction torque of the detent mechanism, of the motor drive current $i_{MOT}$.

After the operating angle further increases and the detent pin 29 gets over the top portion 27a, the detent pin 29 is positioned within the pull-in zone. In this zone, the detent pin 29 is biased by the spring plate 28 to move into the bottom portion 27b corresponding to the R position, where the assist control is stopped.

In the above select operation, the select lever 2 is assisted to move in the operating direction by the electric motor 15 inputted with the FB assist current $i_{FB}$ and the FF assist current $i_{FF}$. This assist control with the both assist currents is superior to assist control using one of the assist currents. This reason comes from following descriptions.

In assist control using only the FF assist current $i_{FF}$, an operating force to move the select lever 2 varies depending on an operating speed of the select lever 2 and/or disturbance from the environment, which causes that the motor drive current does not meet an optimum assist requirement to be needed. For example, when a motor vehicle is parked at a slope way, the parking pawl 30 and the parking wheel 32 are engaged with each other more tightly than when at a level road. This demands more strong assist torque in a select operation, while the assist torque becomes too small when using only FF assist current $i_{FF}$ obtained by referring the FF compensation table.

On the other hand, in assist control using only the feedback assist current $i_{FB}$, a response of assisting is inferior to the assist control using the both current $i_{FB}$ and $i_{FF}$, for a reaction force Fm of the select lever 2 is much larger than a target reaction force Ft of the select lever 2: for example Fm: Ft=10:1. Besides, it is hard in general for a proportional and integration (PI) FB control to follow a large torque variation with high precision On the contrary, the assist control of this embodiment can satisfy all of suitable assist torque, high response to a large reaction force, and high robust stability, for an assist control current supplied to the motor 15 has an FF assist current $i_{FF}$ having a half value of an electric current corresponding to a reaction torque of the detent mechanism and a feedback assist current $I_{FB}$ determined based on a speed difference between a actual operating speed of the select lever 2 and a target operating speed.

In the select operation, an operation of the select lever 2 is immediately detected by the operating angle sensor 51, while is not detected immediately by the assist angle sensor 200 because of play, loose, and/or deformation of the control cables 8 and 18 and the others. Accordingly, a target speed is computed based on an angle difference between the operating angle sensor 51 and the assist angle sensor 200, and then a speed difference between the target speed and an assist speed of the assist actuator 9 is computed to determine an FB assist current and its assist direction. The FB assist current is set to be larger as the angle difference, the speed difference, or an acceleration difference becomes larger. And the first stage of the assist operation, an FF assist current is added to the FB assist current to improve a response.

This assist operation by the assist actuator 9 enables the manual plate lever 20 to move synchronously with and follow the select lever 4, while the first control cable 8 is loosened, which results in that the operating force is reduced. This reduction of the operating force emphasizes detent feeling caused by the detent mechanism to the driver by the reduced operating force to give a good operation feeling.

In the first embodiment, the feedback control part 36 controls differences between the operating angle obtained by the operating angle sensor 51 and the select angle obtained by the assist angle sensor 200 and between the operating speed and the assisting speed to be small. Namely; the former difference is kept to be within a predetermined value set smaller than the sum of a play amount and a lost motion amount of the first and second control cables 8 and 18 and the others, for the cables 8 and 18 elastically deforms in its length and have plays at their connecting portions.

When the assist operation fails, an operating force of the select lever 2 is transmitted from the lever 2 to the mode shift unit 300 mechanically through the first and second control cables 8 and 18, the input and output lever 10 and 13 and the others, which enables the mode shift unit 300 to shift the operation modes of the automatic transmission 19, although its operating force becomes larger than in a normal state.

This operating position select device of the first embodiment has many advantages described below.

The select lever 2 can be shorter than a conventional one by about 150 mm at its portion projecting from a center console toward a passenger compartment without increasing an operating force applied to the select lever 2 so much. This brings a design freedom concerning to an installation location of the select lever and/or a layout of a passenger compartment.

When operating the select lever 2, assist torque from the electric motor 15 is applied to the coupling shaft 12 of the mechanically connecting means to reduce an operating force applied to the select lever. When the operating position select device 100 fails electrically, a driver can shift the mode shift unit 300 by operating the select lever 2, because the select lever 2 and the mode shift unit 300 are mechanically connected by the mechanically connecting means, such as the first and second control cables 8 and 18 and the others.

The motor 15 is driven by a motor drive current consisting of an FB assist current and an FF assist current, which enables the mode shift unit 300 to follow a movement of the select lever 2 to ensure certain shifting the mode shift device 300 despite of play and/or lost motion of the mechanically connecting means.

The feedback control part 36 can reduce a resistance force, for it controls so that an angle difference between an operating angle and an assist angle becomes smaller than the sum of a play amount and a lost motion amount of the mechanically connecting means.

The feedforward control part 42 can control the assist actuator 9 not so as to be delayed or anteceded with respect to the select lever 2, as it controls a position difference between an operating angle and an assist angle to be kept within a predetermined value. In this feedforward control part 42, referring FF control tables to output an FF assist current cuts down calculating tome for obtaining the FF assist current. Using the FF control tables according to an operating direction of the select lever 2 can reduce a difference of an assist amount, outputted from the assist actuator 9, in the operating directions, which is caused by hysteresis of the mechanically connecting means.

High traceability of the assist actuator 9 after the select lever 2 can be obtained, for an FF assist current is controlled to increase as an operating speed and/or an operating acceleration increases.

The control unit 22 can avoid exceeding control for assisting such that the mode shift unit 300 moves beyond a target mode position or is assisted toward a direction opposite to the target mode position, as a motor drive current is reduced or becomes to zero after the detent pin 29 gets over a top portion 27a of the detent plate 27, where a detent force changes from an increasing phase to a reducing phase during a select operation of the select lever 2.

Next, an automatic transmission with an operating position select unit of a second preferred embodiment according to the present invention will be described with reference to the accompanying drawings.

The automatic transmission with the operating position select device of the second embodiment has the same construction as the first embodiment shown in FIG. 1.

Figure 9:
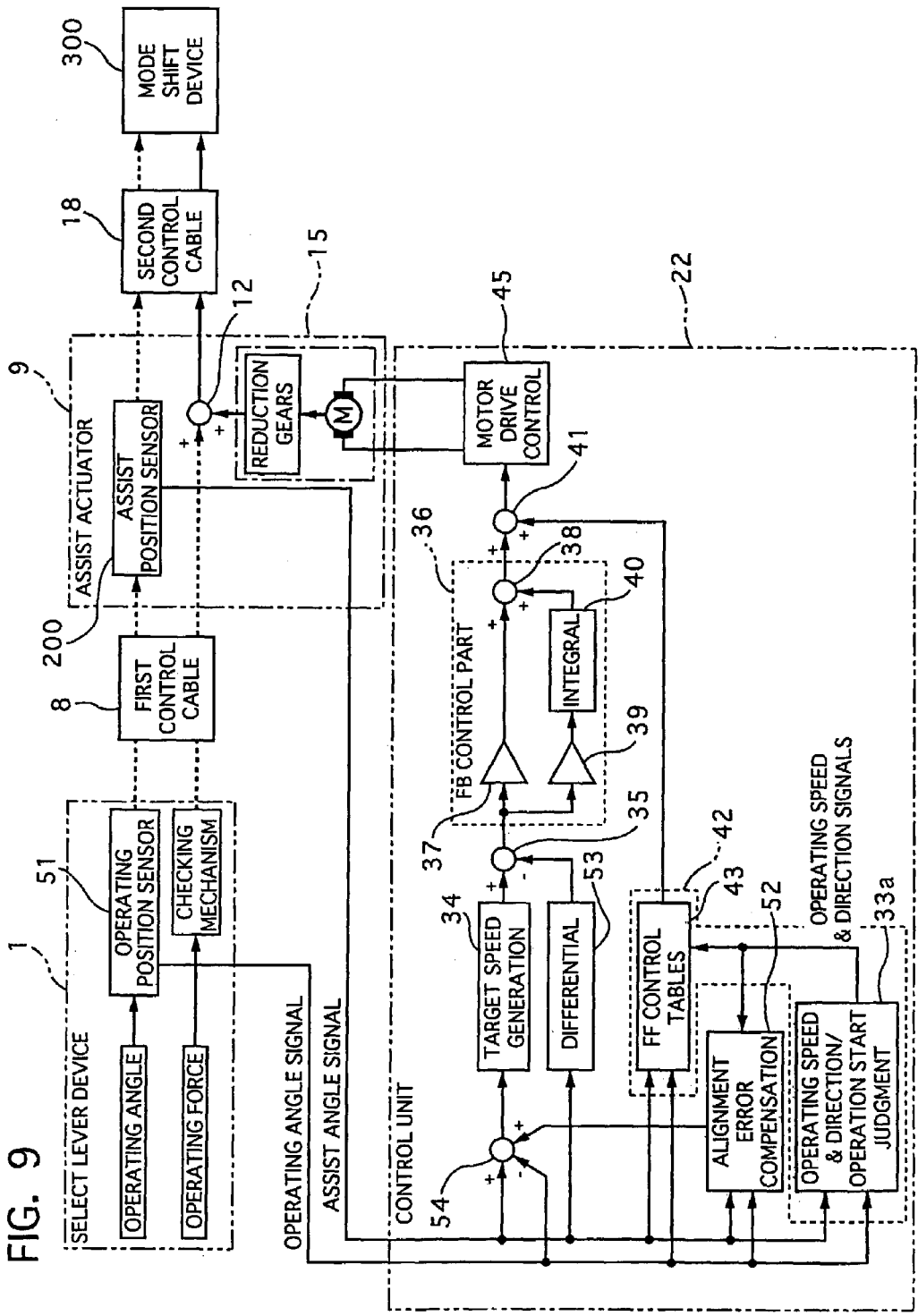
FIG. 9 is a control bock diagram of a control unit used in an operating position select device of a second preferred embodiment according to the present invention.

A control block diagram of a control unit 22 is shown in FIG. 9, which differs in that the control unit 22 lacks the pull-in position judgment part 55 in FIG. 1 but has an operating speed and direction/operation start judgment part 33a in stead of the operating speed and direction judgment part 33 in FIG. 1. The other control blocks are similar to FIG. 4 of the first embodiment.

The operating speed and direction/operation start judgment part 33a judges an operating angle position of a select lever 2 based on an operating angle signal outputted from an operating angle sensor 51, and also judges an operating speed and operating direction of the select lever 2 by calculating differential of the operating angles. The operation start judgment part 33a, further, judges when the select lever 2 is operated by a driver to output its result information to an FF control table part 43 and an alignment error compensation part 52. The other control blocks are the same as the first embodiment.

Figure 10:
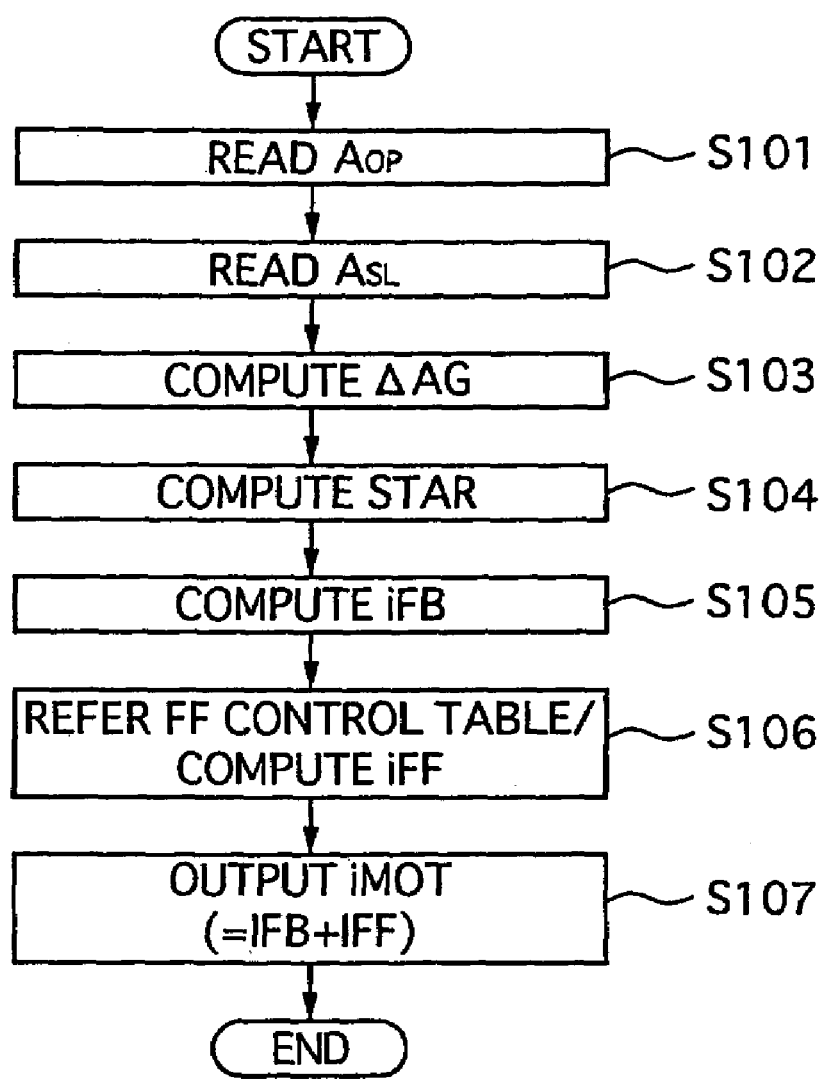
FIG. 10 is a flowchart of a process executed in the control unit, shown in FIG. 9, for controlling an assist actuator during a select operation.

The control unit 22 executes an assist control start judgment process according to a flowchart shown in FIG. 10. This process is executed in the control unit 22 at a certain control period when the select lever 2 is held in one of the select mode positions.

At step S101, the control unit 22 receives an operating angle signal from the operating angle sensor 51 to read an operating angle $A_{OP}$ of the select lever 2, and then the flow goes to step S102. At the step S102, the control unit 22 receives an assist angle signal from the assist angle sensor 200 to read an assist angle $A_{SL}$ of a coupling shaft 12 of an assist actuator 9, and then the flow goes to step S103.

At the step S103, a first adder 54 computes an angle difference $\Delta AG$ between the operating angle $A_{OP}$ and the assist angle $A_{SL}$, and then the flow goes to step S104.

At the step S104, a target speed generation part 34 computes a target speed STAR based on the angle difference $\Delta AC$; and then the flow goes to step S105.

At the step S105, a feedback control part 36 calculates a feedback current $i_{FB}$, and then the flow goes to step S106.

At the step S106, a feedforward control table part 43 computes a feed back assist current $i_{FF}$ with referring FF control tables.

At the step S107, a fourth adder 41 outputs a motor drive current, obtained by adding the FF assist current $i_{FF}$ to the FB current $i_{FB}$, to a motor drive control part 45.

Figure 11:
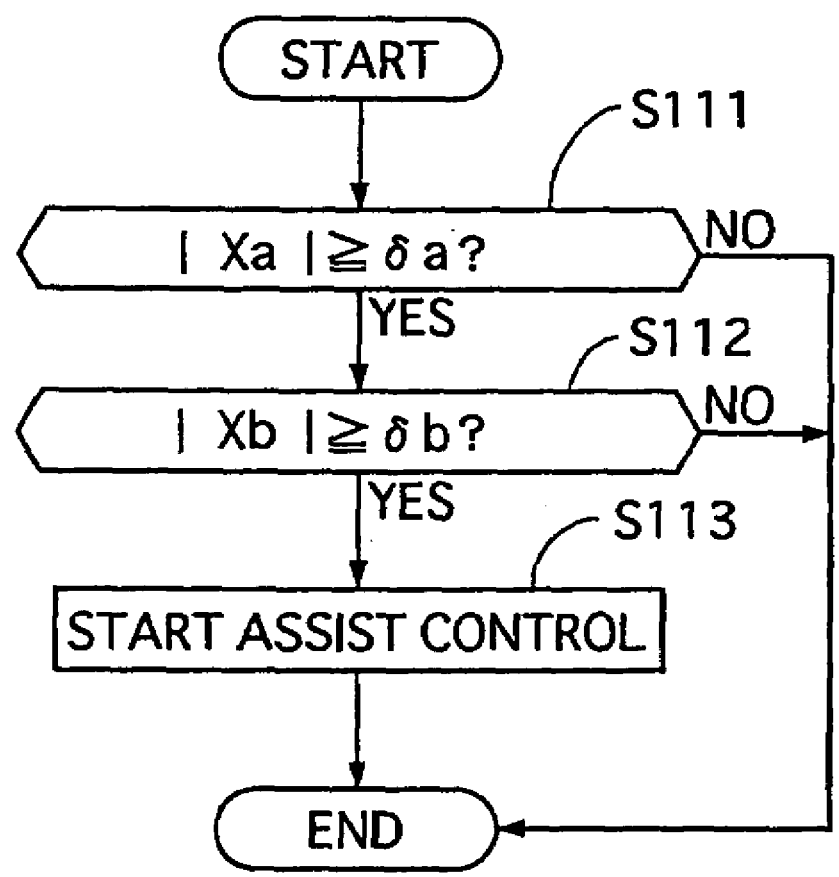
FIG. 11 is a flowchart of a process executed in the control unit, shown in FIG. 9, for judging whether or not select assist control is started.
Figure 13:
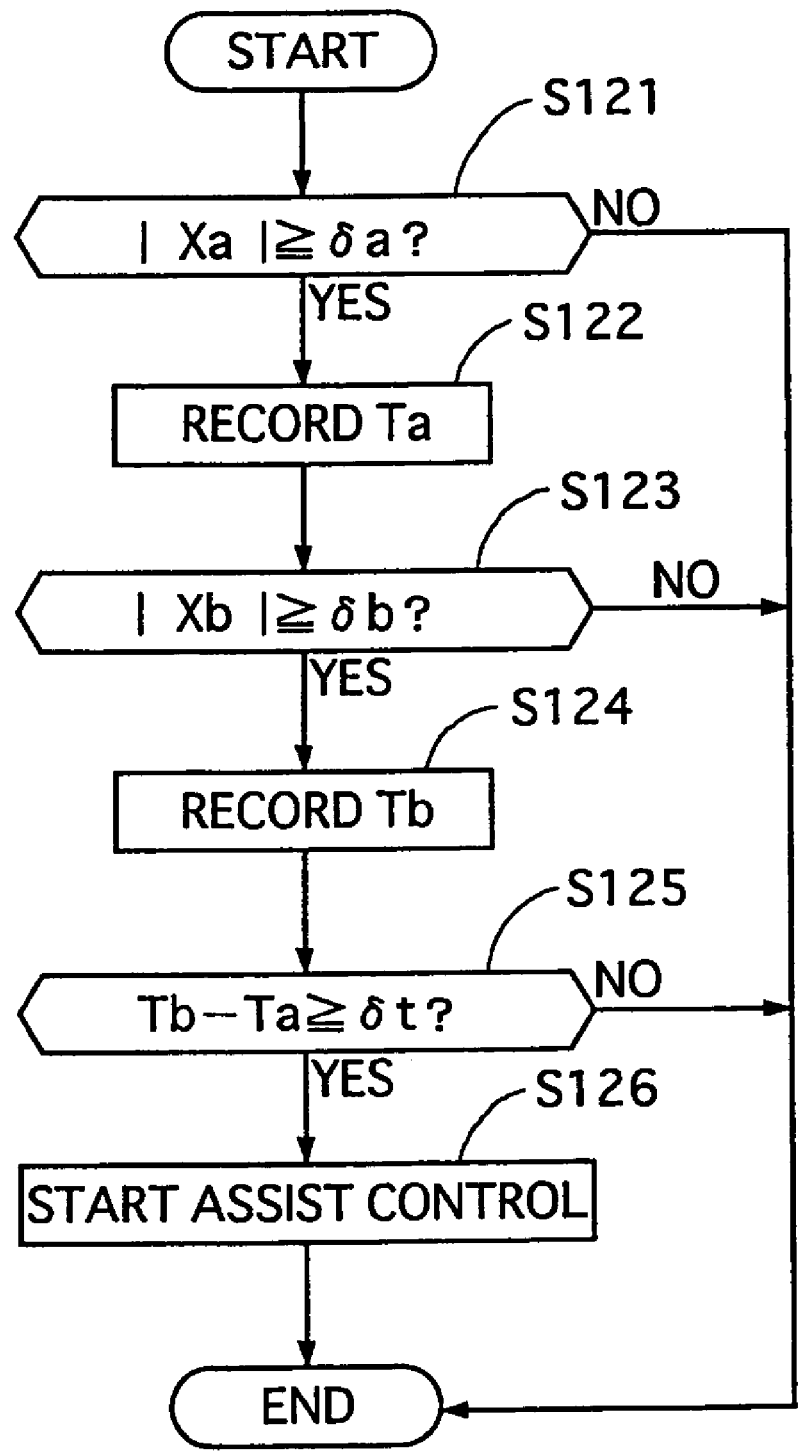
FIG. 13 is a flowchart of a process executed in a control unit, used in an operating position select device of a third preferred embodiment according to the present invention, for judging whether or not select assist control is started.

FIG. 11 shows a flowchart for judging whether or not to start assist control. This flowchart is executed in the control unit 22 at certain control period when a select lever 2 is held in one of the select mode positions.

At step S111, the operation start judgment part 33a judges based on the operating angle $A_{OP}$ whether or not an absolute value of a displacement amount |Xa| of the select lever 2 is equal to or larger than a first value δa. If YES the flow goes to step S112, while, if NO, the execution of this process is ended.

At the step S112, the operation start judgment part 33a judges based on the assist angle $A_{SL}$ whether or not an absolute value of a displacement amount |Xb| of the coupling shaft 12 of the assist actuator 9 is equal to or larger than a second value δb. If YES the flow goes to step S113, while, if NO, the execution of this process is ended.

At the step S113, the control unit 22 starts the assist control according to the flowchart shown in FIG. 10.

FIG. 12 shows an example of the displacement amounts Xa and Xb of the select lever 2 and the coupling shaft 12 according to time after the select lever 2 is moved from P position to R position and time after the select lever 2 is moved from R position to P position respectively. In this example, the first and second values are set to "2."

In this example case, the upper part of the table of FIG. 12 shows that when the operating position select device 100 is in a normal state, the absolute value of the displacement amount |Xa| becomes "4," which exceeds the first value, and the absolute value of the displacement amount |Xb| becomes "2," which exceeds the second value at time of 5ΔT after the select lever 2 is moved from P position to R position.

Similarly, it shows that when the operating position select device 100 is in a normal state, the absolute value of the displacement amount |Xa| becomes "4," which exceeds the first value, and the absolute value of the displacement amount |Xb| becomes "2," which exceeds the second value at time of 5ΔT after the select lever 2 is moved from R position to P position.

In these normal cases, the control unit 22 starts the assist control at the time of 5ΔT.

On the contrary, the lower part of the table shows when the operating position select device 100 is in an abnormal state, such that an electric wire is broken, the absolute value of the displacement amount |Xa| becomes "4," which exceeds the first value, while the absolute value of the displacement amount |Xb| is kept to be "0," which falls below the second value at time of 5ΔT after the select lever 2 is moved from P position to R position.

It shows that when the operating position select device 100 is in an abnormal state, the absolute value of the displacement amount |Xa| becomes "4," which exceeds the first value, while the absolute value of the displacement amount |Xb| is kept to be "2," which falls below the second value at time of 5ΔT after the select lever 2 is moved from R position to P position.

In these abnormal cases, the control unit 22 is forbidden to start the assist control.

Therefore, this second embodiment has an advantage of avoiding assist control when the select lever 2 is moved slightly by an unintentional touch, in addition to advantages similar to the first embodiment.

Next, an automatic transmission with an operating position select device of a third preferred embodiment according to the present invention will be described with reference to the accompanying drawings.

This third embodiment has a construction similar to the second embodiment, while a flowchart executed in a control unit for judging whether or not to start assist control is different from the flowchart shown in FIG. 11 of the second embodiment.

The control unit 22 executes an assist control start judgment process according to a flowchart shown in FIG. 12. This process is executed in the control unit at a certain control period when a select lever 2 is held in one of the select mode positions.

At step S121, an operating speed and direction/operation start judgment part 33a judges based on the operating angle $A_{OP}$ whether or not an absolute value of a displacement amount |Xa| of the select lever 2 is equal to or larger than a first value δa. If YES the flow goes to step S122, while, if NO, the execution of this process is ended.

At the step S122, the present time Ta is recorded, and then the flow goes to step S123.

At the step S123, the operation start judgment part 33a judges based on the assist angle $A_{SL}$ whether or not an absolute value of a displacement amount |Xb| of the coupling shaft 12 of the assist actuator 9 is equal to or larger than a second value δb. If YES, the flow goes to step S124, while, if NO, the execution of this process is ended.

At the step S124, the present time Tb is recorded, and then the flow goes to step S125.

At the step S125, it is judged whether or not a time difference (Tb−Ta) is equal to or larger than a third value δt. If YES, the flow goes to step S 126, while, if NO, the execution of this process is ended.

At the step S126, the control unit 22 starts the assist control according to the flowchart shown in FIG. 10.

FIG. 14 shows an example of relation of the displacement amounts Xa and Xb of the select lever 2 and the coupling shaft 12 with respect to time after the select lever 2 is moved from P position to R position and time after the select lever 2 is moved from the R position to the P position respectively.

In this example, the first and second values are set to "2," and the third value δt is set to ΔT.

In this example case, the upper part of the table of FIG. 14 shows that when the operating position select device 100 is in a normal state, the absolute value of the displacement amount |Xa| reaches the first value δa at time of 4ΔT, and the absolute value of the displacement amount |Xb| reaches the second value δb at time of 6ΔT in both cases after moving the select lever 2 from the P position to the R position and from the R position to the P position. Accordingly, the control unit 22 starts the assist control at time of 6ΔT.

On the contrary, the lower part of the table shows that when the operating position select device 100 is in an abnormal state, the absolute value of the displacement amount |Xa| reaches the first value δa at time of 4ΔT, while the absolute value of the displacement amount |Xb| has already reached the second value δb at time of 3ΔT in both cases after moving the select lever 2 from the P position to the R position and from the R position to the P position. This results in that the time difference (Tb−Ta) becomes "−ΔT," which is smaller than the third value Δt. Accordingly, the control unit 22 is forbidden to start the assist control.

Therefore, this third embodiment has an advantage of avoiding assist control when the operating position select device 100 is in an abnormal state, in addition to advantages similar to the first embodiment.

Next, an automatic transmission with an operating position select device of a fourth preferred embodiment according to the present invention will be described with reference to the accompanying drawings.

Figure 15:
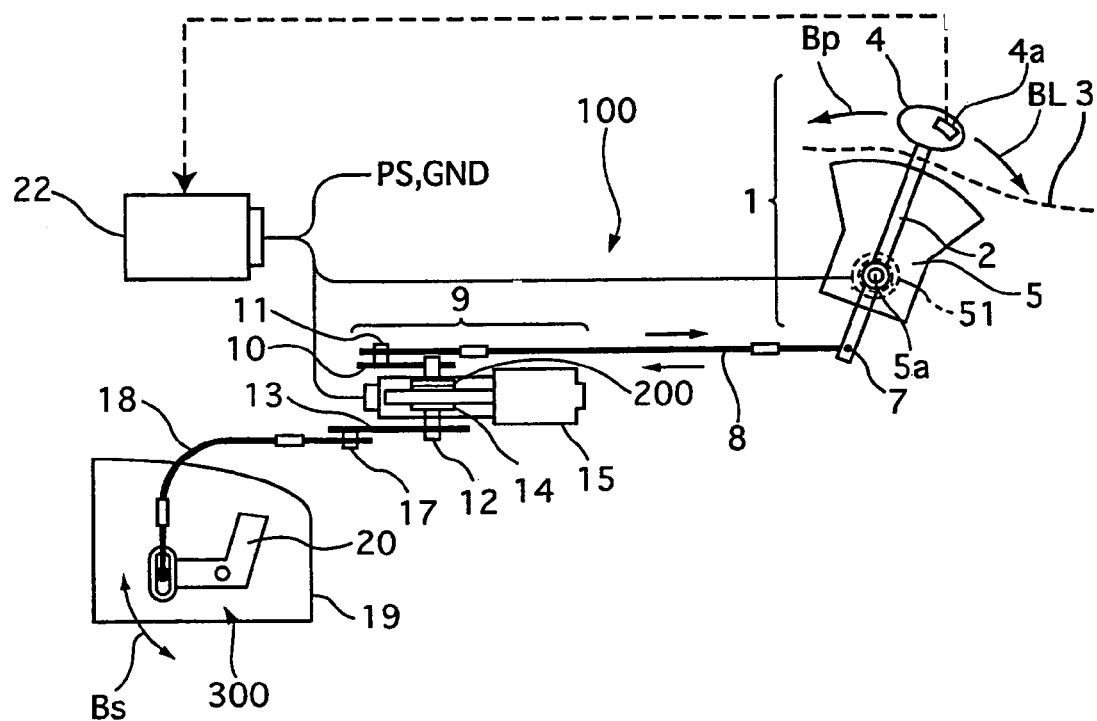
FIG. 15 is a schematic diagram showing an automatic transmission with an operating position select device of a fourth preferred embodiment according to the present invention.

Referring to FIG. 15 of the drawing, there is shown the automatic transmission 19 with the operating position select device 100 of the fourth embodiment.

A select lever 2 of a select lever unit 1 is provided on its knob 4 with a touch sensor 4a to detect whether or not a driver holds the knob 4 and output a touch signal, which can be a pressure-sensitive sensor, an electric capacitance sensor, an infrared sensor, or the like. The other construction is similar to the first embodiment shown in FIG. 1.

Figure 16:
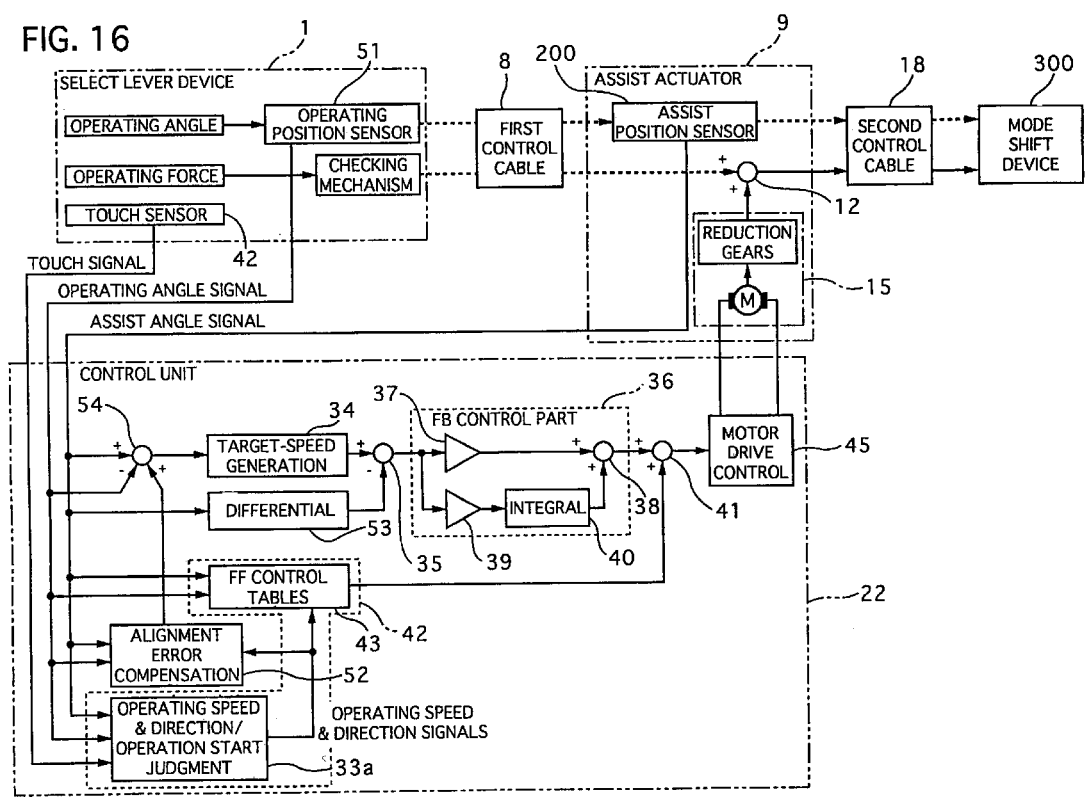
FIG. 16 is a control bock diagram of a control unit used in the operating position select device shown in FIG. 15.

FIG. 16 shows a control block diagram of a control unit 22. The touch sensor 4a outputs the touch signal to an operating speed/operation start judgment part 33a, and other control blocks are similar to the second embodiment shown in FIG. 9.

Figure 17:
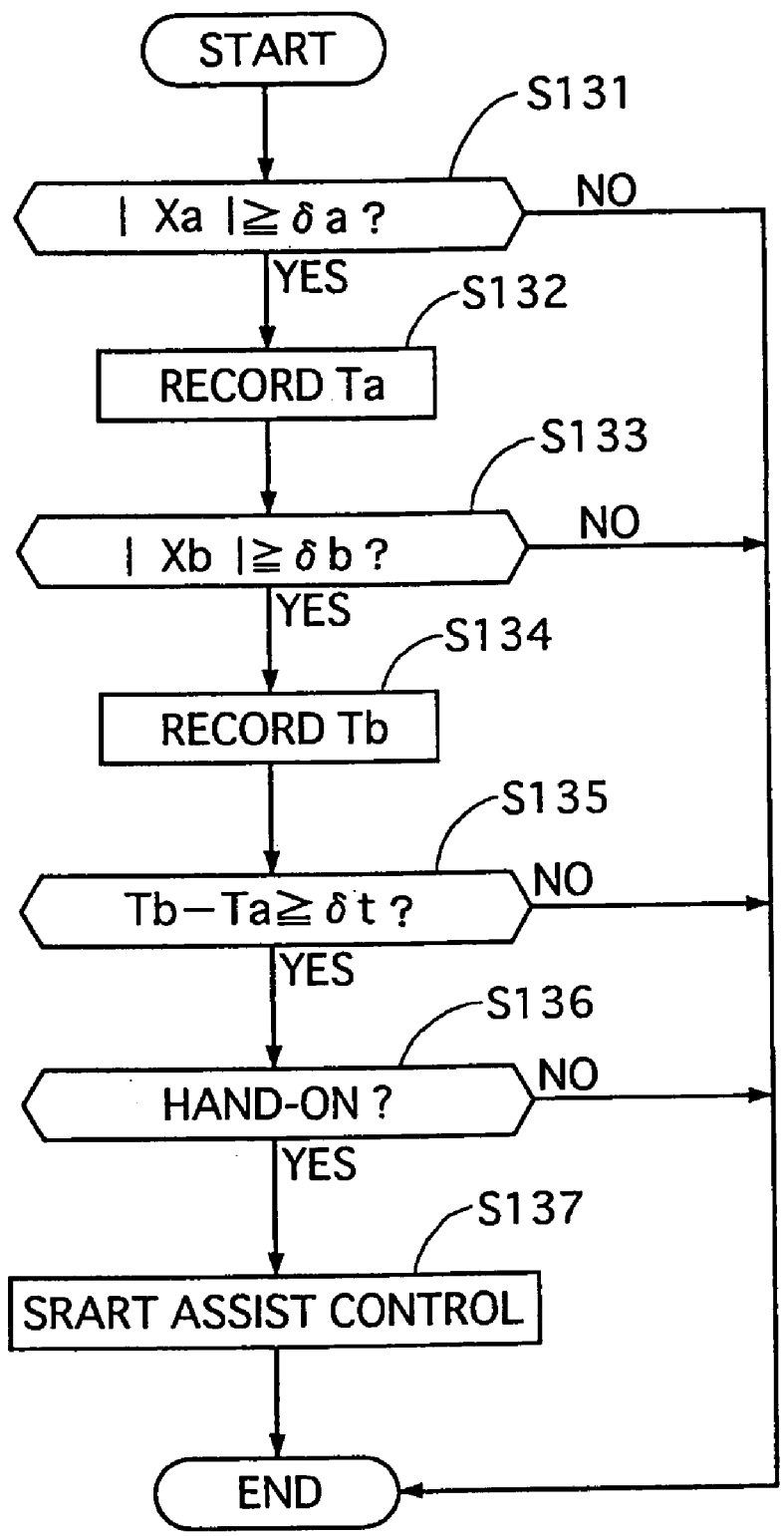
FIG. 17 is a flowchart of a process executed in a control unit, shown in FIG. 15, for judging whether or not select assist control is started.

The control unit 22 executes a assist control start judgment process according to a flowchart shown in FIG. 17 to judge whether or not to start assist control. This process is executed at a certain control period when the select lever 2 is held in one of the select mode positions.

At step S131, the operation start judgment part 33a reads a displacement amount Xa based upon an operating angle signal from an operating angle sensor 51 to judge whether or not the absolute value of the displacement amount |Xa| is equal to or larger than a first value δa. If YES, the flow goes to step S132, while, if NO, the execution of this process is ended.

At the step S132, the present time Ta is recorded, and then the flow goes to step S133.

At the step S133, the operation start judgment part 33a reads a displacement amount Xb based upon an assist angle signal from an assist angle sensor 200 to judge whether or not the absolute value of the displacement amount |Xb| is equal to or larger than a second value δb. If YES, the flow goes to step S134, while, if NO, the execution of this process is ended.

At the step S134, the present time Tb is recorded, and then the flow goes to step S135.

At the step S135, the operation start judgment part 33a computes a time difference (Tb−Ta) is equal to or larger than a third value δb. If YES, the flow goes to step S136, while, if NO, the execution of this process is ended.

At the step S136, the operation start judgment part 33a judges based on the touch signal from the touch sensor 4a whether or not the driver touches the knob 4. If YES, the flow goes to step S137, while, the execution of this process is ended.

At the step S137, the control unit 22 starts the assist control according to the flowchart shown in FIG. 10.

FIG. 18 shows an example of the displacement amounts Xa and Xb of the select lever 2 and the coupling shaft 12 and a value of the touch signal Xs according to time after the select lever 2 is moved from P position to R position and time after the select lever 2 is moved from the R position to the P position respectively. In this example, the first and second values are set to "2," and the third value δt is set to ΔT. The value Xs becomes "1" when the knob 4 is touched by a driver, while it becomes "0" when untouched.

In this example case, the upper part of the table of FIG. 18 shows that when the operating position select device 100 is in a normal state, the absolute value of the displacement amount |Xa| reaches the first value δa at time of 3ΔT, and the absolute value of the displacement amount |Xb| reaches the second value δb at time of 4ΔT in both cases after moving the select lever 2 from the P position to the R position and from the R position to the P position. In this state, the value Xs becomes "1" at 5ΔT. Accordingly, the control unit 22 starts the assist control at time of 5ΔT.

On the contrary, the lower part of the table shows that when the operating position select device 100 is in an abnormal state, the absolute value of the displacement amount |Xa| reaches the first value δa at time of 4ΔT, while the absolute value of the displacement amount |Xb| has already reached the second value δb at time of 3ΔT in both cases after moving the select lever 2 from the P position to the R position and from the R position to the P position. This results in that the time difference (Tb−Ta) becomes "−ΔT", which is smaller than the third value δt. Accordingly, the control unit 22 is forbidden to start the assist control.

Therefore, this fourth embodiment has an advantage of avoiding assist control when the operating position select device 100 is in an abnormal state and/or when the select lever 2 is unintentionally moved slightly, in addition to advantages similar to the first embodiment.

Next, an automatic transmission with an operating position select device of a fifth preferred embodiment according to the present invention will be described with reference to the accompanying drawings.

The automatic transmission with the operating position select device has a construction similar to the second embodiment.

Figure 19:
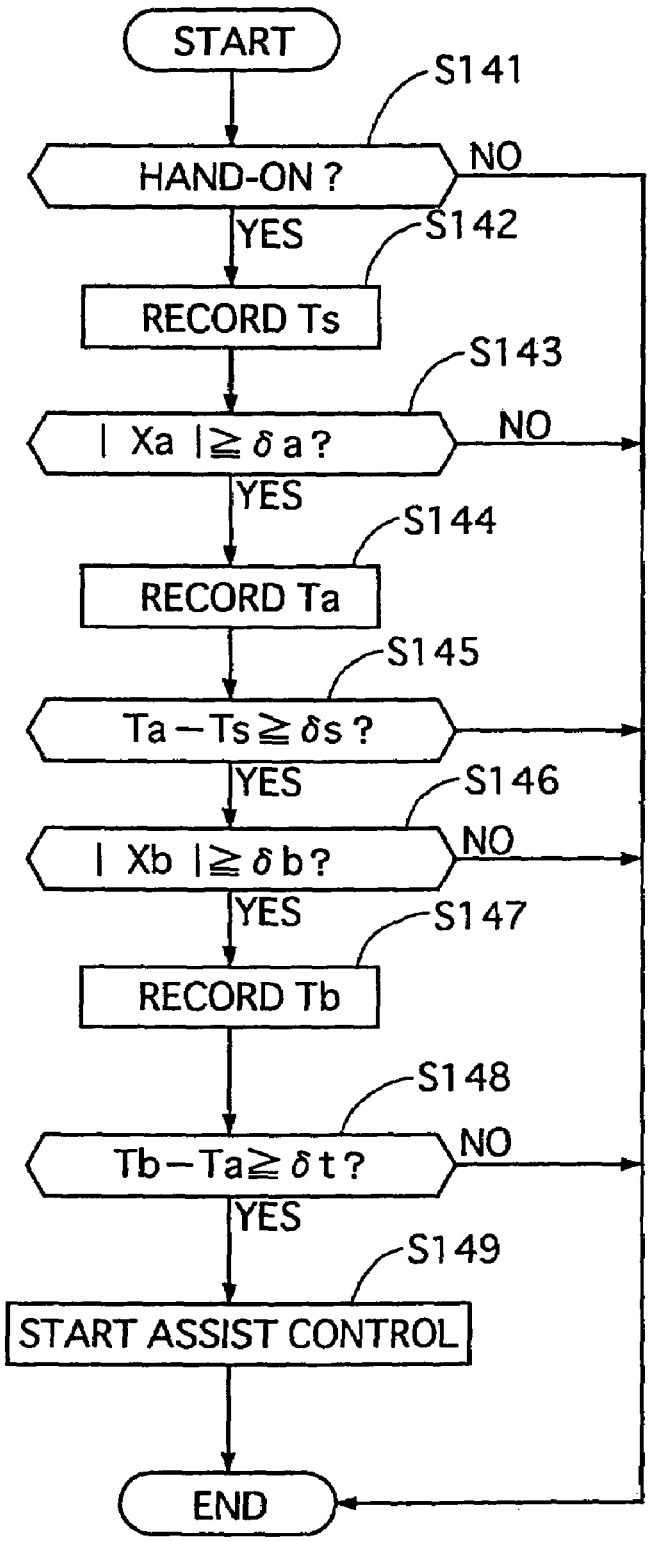
FIG. 19 is a flowchart of a process executed in a control unit, used in an operating position select device of a fifth preferred embodiment according to the present invention, for judging whether or not select assist control is started.

A control unit 22 has control blocks similar to the second embodiment shown in FIG. 9, and executes an assist control start judgment process according a flowchart shown in FIG. 19. This process is executed at a certain control period when a select lever 2 is held in one of the select mode positions.

At step S141, an operating speed and direction/operation start judgment part 33a judges based upon a touch signal from a touch sensor 4a whether or not a driver hold a knob 4. If YES, the flow goes to step S142, while, if NO, the execution of this process is ended.

At the step S142, the present time Ts is recorded, and then the flow goes to step S143.

At the step S143, the operation start judgment part 33a reads a displacement amount Xb based upon an operating angle signal from an operating angle sensor 51 to judge whether or not an absolute value of a displacement amount |Xa| is equal to or larger than a first value δa. If YES, the flow goes to step S144, while, if NO, the execution of this process is ended.

At the step S144, the present time Ta is recorded, and then the flow goes to step S145.

At the step S145, the operation start judgment part 33a computes a time difference (Ta−Ts) and judges whether or not the time difference (Ta−Ts) is equal to or larger than a fourth value δs. If YES, the flow goes to step S146, while, if NO, the execution of this process is ended.

At the step S146, the operation start judgment part 33a reads a displacement amount Xb based upon an assist angle signal from an assist angle sensor 200 to judge whether or not the absolute value of the displacement amount |Xb| is equal to or larger than a second value δb. If YES, the flow goes to step S147, while, if NO, the execution of this process is ended.

At the step S147, the present time Tb is recorded, and then the flow goes to step S148.

At the step S148, the operation start judgment part 33a computes a time difference (Tb−Ta) and judges whether or not the time difference (Tb−Ta) is equal to or larger than a third value δt. If YES, the flow goes to step S149, while, if NO, the execution of this process is ended.

At the step S149, the control unit 22 starts the assist control.

FIG. 20 shows an example of the displacement amounts Xa and Xb of the select lever 2 and the coupling shaft 12 and a value of the touch signal Xs according to time after the select lever 2 is moved from P position to R position and time after the select lever 2 is moved from the R position to the P position respectively. In this example, the first and second values are set to "2," and the third value δt is set to ΔT. The value Xs becomes "1" when a knob 4 is touched, while it becomes "0" when untouched.

In this example case, the upper part of the table of FIG. 20 shows that when the operating position select device 100 is in a normal state, the value Xs becomes "1" at the time of 2ΔT, for the knob 4 is touched, and the absolute value of the displacement amount |Xa| reaches the first value δa at time of 4ΔT, and the absolute value of the displacement amount |Xb| reaches the second value δb at time of 6ΔT in both cases after moving the select lever 2 from the P position to the R position and from the R position to the P position. Accordingly, the control unit 22 starts the assist control at time of 6ΔT.

On the contrary, the lower part of the table shows that when the operating position select device 100 is in an abnormal state, the absolute value of the displacement amount |Xa| reaches the first value δa at time of 4ΔT, while the value Xs becomes "1" at the time of 5ΔT. Accordingly, the control unit 22 is forbidden to start the assist control.

Therefore, this fifth embodiment has an advantage of avoiding assist control when the operating position select device 100 is in an abnormal state and/or when the select lever 2 is unintentionally moved slightly, in addition to advantages similar to the first embodiment.

While there have been particularly shown and described with reference to preferred embodiments thereof, it will be understood that various modifications may be made therein, and it is intended to cover in the appended claims all such modifications as fall within the true spirit and scope of the invention.

For example, a mechanically connecting means may be rods or linkage instead of the first and second control cables 8 and 18 in the above embodiments. A select lever may be shaped differently from the above embodiments.

A ratio of a feedforward current to a feedback current may be set arbitrarily according to a target operating characteristics: A motor drive current may be only a feedback current.

An assist control start judgment may be performed based on an operating speed of a select lever and a assist speed of an assist actuator. These speeds are easily obtained by calculating differentials of an operating position from an operating position sensor and an assist position from a assist position sensor.

An operating position can be detected by a displacement amount of a select lever or a mechanically connecting means that connects the select lever and an assist actuator with each other instead of the operating angle of the shift lever 2.

An assist position can be detected by a displacement amount of a mechanically connecting means that connects an assist actuator and a mode shift unit with each other, or a motor drive current supplied to an electric motor, or the rotational number of the electric motor.

Although the assist actuator 9 is controlled according to the angle difference between the operating angle of the select lever 2 and the assist angle of the coupling shaft 12 of the assist actuator 9 in the above embodiments, it may be controlled according to a speed difference or an acceleration difference between a select lever and the assist actuator.

The entire contents of Japanese Patent Applications (Tokugan) No. 2003-281209 filed Jul. 28, 2003 and (Tokugan) No. 2003-325152 filed Sep. 17, 2003 are incorporated herein by reference.

What is claimed is:

1. An operating position select device for an automatic transmission comprising:
   a select lever unit having a select lever operated by a driver;
   an operating position sensor which detects an operating position of said select lever and outputs an operating position signal;
   a mode shift unit mounted on the automatic transmission to shift operation modes of the automatic transmission;
   a detent mechanism including a detent pin and a detent plate connected with a manual valve, the detent plate being formed with a cam having bottom portions respectively corresponding to select positions and each arranged between adjacent top portions and the pin being pressed toward the cam where the detent plate and the pin are moved relative to each other according to a select operation of said select lever;
   a mechanically connecting means which mechanically connects said select lever and said mode shift unit with each other;
   an assist actuator which is arranged between said select lever and said mode shift unit and outputs assist torque to an intermediate portion of said mechanically connecting means to shift the mode shift unit;
   an assist position sensor which detects an assist position of said assist actuator and outputs an assist position signal; and
   a control unit which receives the operating position signal and the assist position signal and controls a drive current to be supplied to said assist actuator based on a position difference between the operating position and the assist position so as to obtain the assist torque that can reduce resistance force caused by the detent mechanism.

2. The operating position select device according to claim 1, wherein said control unit has a target speed generation means for computing a target speed based on a position difference between the operating position and the assist position to generate a target speed signal and a feedback control means for computing a feedback assist current based on a speed difference between an assist speed of said assist actuator and the target speed computed by the target speed generation means so that the drive current includes the feedback assist current.

3. The operating position select device according to claim 2, wherein the feedback control means controls the position difference to be kept within a predetermined value.

4. The operating position select device according to claim 3, wherein the predetermined value is set so that the position difference becomes smaller than the sum of a play amount and a lost motion amount of the mechanically connecting means.

5. The operating position select device according to claim 2, wherein said control unit has a feedforward control means which computes a feedforward assist current based on the operating position and the assist position to output a feedforward current signal, and said control unit computes the drive current by adding the feedforward assist current to the feedback assist current.

6. The operating position select device according to claim 5, wherein the feedforward control means is provided with a control table having data to determine the feedforward assist current according to an operating direction of the select lever.

7. The operating position select device according to claim 6, wherein the feedforward assist current increases as one of an operating speed and an operating acceleration of said select lever becomes larger.

8. The operating position select device according to claim 2, wherein said control unit starts to drive said assist actuator when said select lever is held, and an operating position difference computed based on the operating positions of said select lever is not less than a first value, and an assist position difference computed based on the assist positions of said assist actuator is not less than a second value.

9. The operating position select device according to claim 8, wherein said control unit starts to drive said assist actuator when the assist position difference becomes not less than the second value after the operating position difference is not less than the first value.

10. The operating select device according to claim 8, wherein said control unit is electrically connected to a touch sensor for detecting whether or not a knob of said select lever is touched by the driver, said control unit starting to drive said assist actuator when a touch on the knob is detected by the touch sensor.

11. The operating position select device according to claim 1, wherein said mode shift unit includes the detent mechanism generating detent force and ensuring a valve spool of the manual valve by the detent force to be positioned in a selected position, said control unit reducing the drive current when the detent force changes from an increasing phase where the detent pin ascends from the bottom portion to the top portion of the cam to a reducing phase where the detent pin descends from the top portion to the adjacent bottom portion during a select operation of said select lever.

12. The operating position select device according to claim 11, wherein the drive current is reduced to zero by said control unit.

13. The operating position select device according to claim 11, wherein said control unit starts to drive said assist actuator when said select lever is held, and an operating position difference computed based on the operating positions of said select lever is not less than a first value, and an assist position difference computed based on the assist positions of said assist actuator is not less than a second value.

14. The operating position select device according to claim 13, wherein said control unit starts to drive said assist actuator when the assist position difference becomes not less than the second value after the operating position difference is not less than the first value.

15. The operating position select device according to claim 13, wherein said control unit is electrically connected to a touch sensor for detecting whether or not a knob of said select lever is touched by the driver, said control unit starting to drive said assist actuator when a touch on the knob is detected by the touch sensor.

16. The operating position select device according to claim 1, wherein the intermediate portion of said mechanically connecting means is positioned nearer to said mode shift unit than said select lever.

17. The operating position select device according to claim 1, wherein said control unit starts to drive said assist actuator when said select lever is held, and an operating position difference computed based on the operating positions of said select lever is not less than a first value, and an assist position difference computed based on the assist positions of said assist actuator is not less than a second value.

18. The operating position select device according to claim 17, wherein said control unit starts to drive said assist actuator when the assist position difference becomes not less than the second value after the operating position difference is not less than the first value.

19. The operating position select device according to claim 17, wherein said control unit is electrically connected to a touch sensor for detecting whether or not a knob of said select lever is touched by the driver, said control unit starting to drive said assist actuator when a touch on the knob is detected by the touch sensor.

20. The operating position select device according to claim 19, wherein said control unit starts to drive said assist actuator when the operating position difference is not less than the first value, and the assist position difference is not less than a second value after the touch sensor detects a touch on the knob by the driver.

* * * * *